(12) United States Patent
Tanaka

(10) Patent No.: US 7,372,630 B2
(45) Date of Patent: May 13, 2008

(54) LASER, IRRADIATION APPARATUS, LASER IRRADIATION METHOD, AND METHOD FOR MANUFACTURING SEMICONDUCTOR DEVICE

(75) Inventor: Koichiro Tanaka, Kanagawa (JP)

(73) Assignee: Semiconductor Energy Laboratory Co., Ltd., Kanaga-ken (JP)

( * ) Notice: Subject to any disclaimer, the term of this patent is extended or adjusted under 35 U.S.C. 154(b) by 128 days.

(21) Appl. No.: 10/217,477

(22) Filed: Aug. 14, 2002

(65) Prior Publication Data

US 2003/0035219 A1 Feb. 20, 2003

(30) Foreign Application Priority Data

Aug. 17, 2001 (JP) ............................... 2001-247778

(51) Int. Cl.
*G02B 27/10* (2006.01)

(52) U.S. Cl. ..................................................... 359/619

(58) Field of Classification Search ................ 359/618, 359/619, 621, 622, 626; 438/795–799, 482, 438/509

See application file for complete search history.

(56) References Cited

U.S. PATENT DOCUMENTS

| | | | | |
|---|---|---|---|---|
| 5,432,603 A | * | 7/1995 | Sentoku et al. | ............. 356/490 |
| 5,534,970 A | * | 7/1996 | Nakashima et al. | ........... 355/53 |
| 5,586,133 A | * | 12/1996 | Sommargren | ............ 372/29.02 |
| 5,610,718 A | * | 3/1997 | Sentoku et al. | ............. 356/490 |
| 5,897,799 A | | 4/1999 | Yamazaki et al. | |
| 6,248,606 B1 | | 6/2001 | Ino et al. | |
| 6,391,528 B1 | * | 5/2002 | Moshrefzadeh et al. | ..... 430/321 |
| 6,535,535 B1 | | 3/2003 | Yamazaki et al. | |
| 6,545,248 B2 | | 4/2003 | Tanaka et al. | |
| 6,563,843 B1 | | 5/2003 | Tanaka | |
| 6,597,348 B1 | | 7/2003 | Yamazaki et al. | |
| 6,639,728 B2 | * | 10/2003 | Murra et al. | ................. 359/623 |
| 6,678,023 B1 | | 1/2004 | Yamazaki et al. | |
| 2001/0028925 A1 | * | 10/2001 | Moshrefzadeh et al. | ..... 427/552 |
| 2002/0134765 A1 | | 9/2002 | Tanaka et al. | |

FOREIGN PATENT DOCUMENTS

| | | |
|---|---|---|
| JP | 09-102468 A | 4/1997 |
| JP | 09-102468 A | 4/1997 |
| JP | 2000-150412 A | 5/2000 |

* cited by examiner

*Primary Examiner*—Scott J. Sugarman
*Assistant Examiner*—Joseph Martinez
(74) *Attorney, Agent, or Firm*—Nixon Peabody LLP; Jeffrey L. Costellia

(57) ABSTRACT

Providing a method and apparatus for efficiently irradiating a uniform laser light on an irradiation surface even when a laser light of high coherence or a large size substrate is used. The laser irradiation apparatus of the invention comprises a laser; means for dividing a laser light emitted from the laser into plural laser beams; means for synthesizing the laser beams on the irradiation surface or place in the vicinity thereof thereby forming a laser light having a periodical energy distribution; and means for moving the substrate relative to the laser light. Such a laser irradiation apparatus may be used to anneal the overall surface of a semiconductor film.

30 Claims, 17 Drawing Sheets

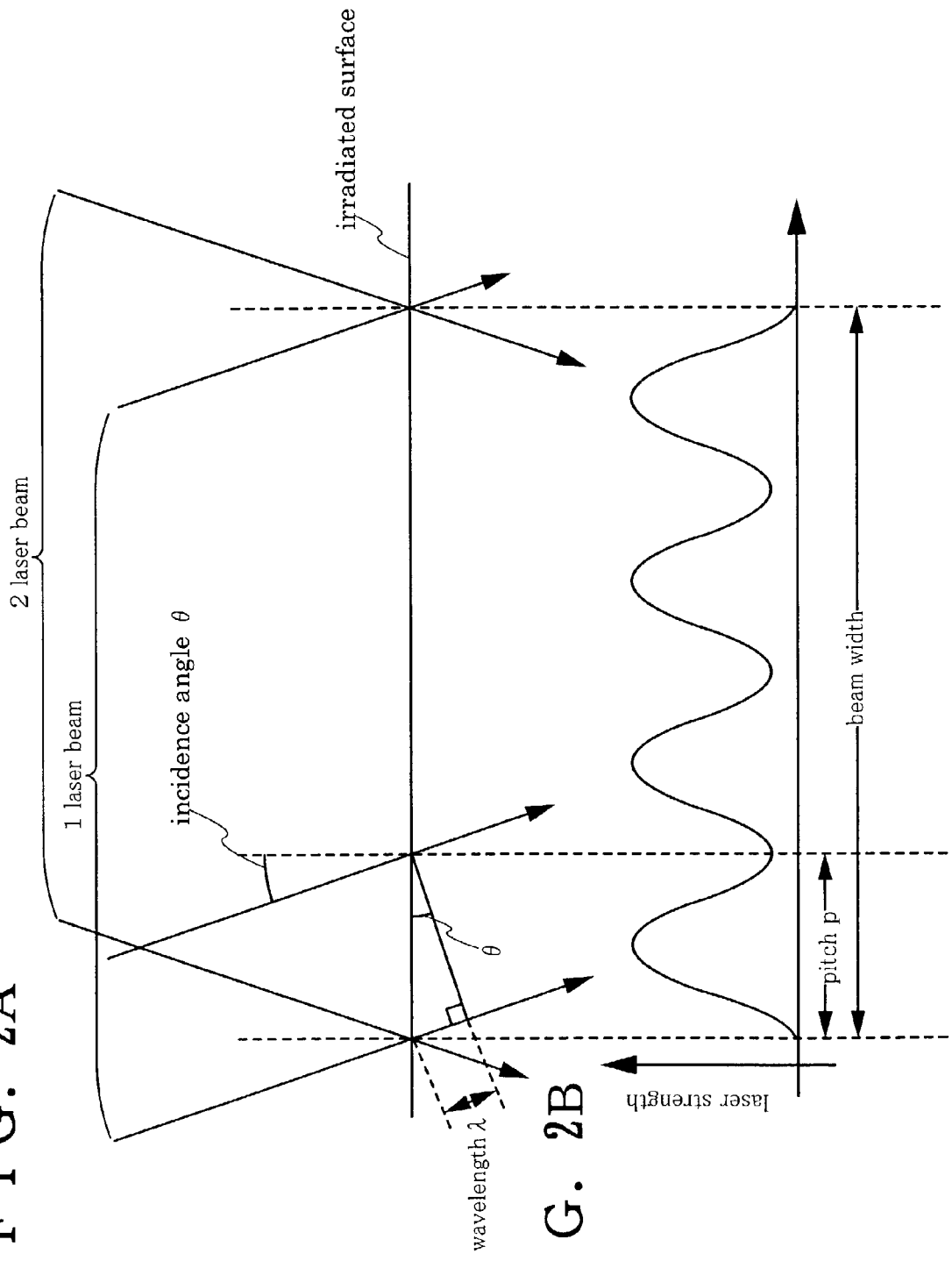

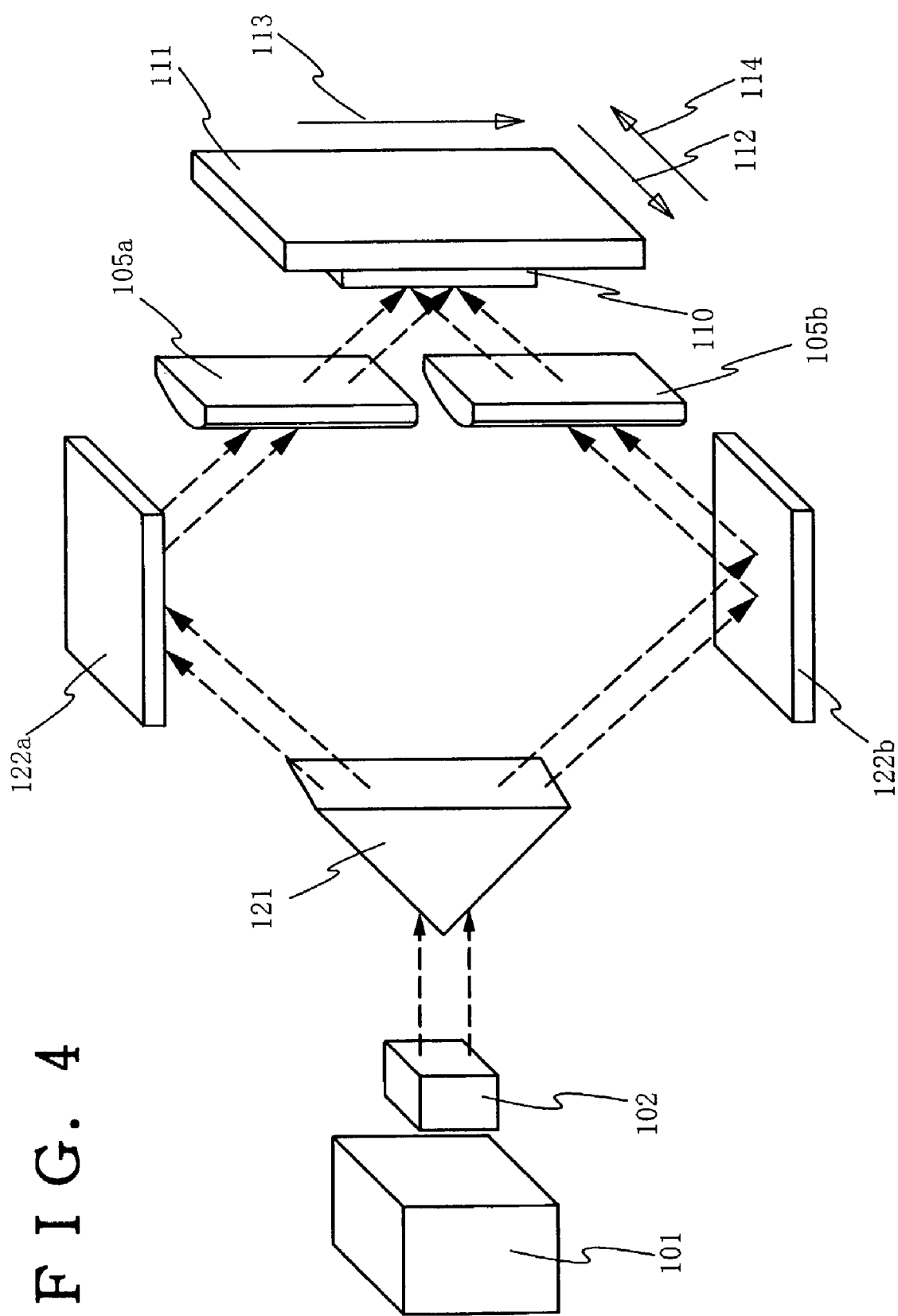

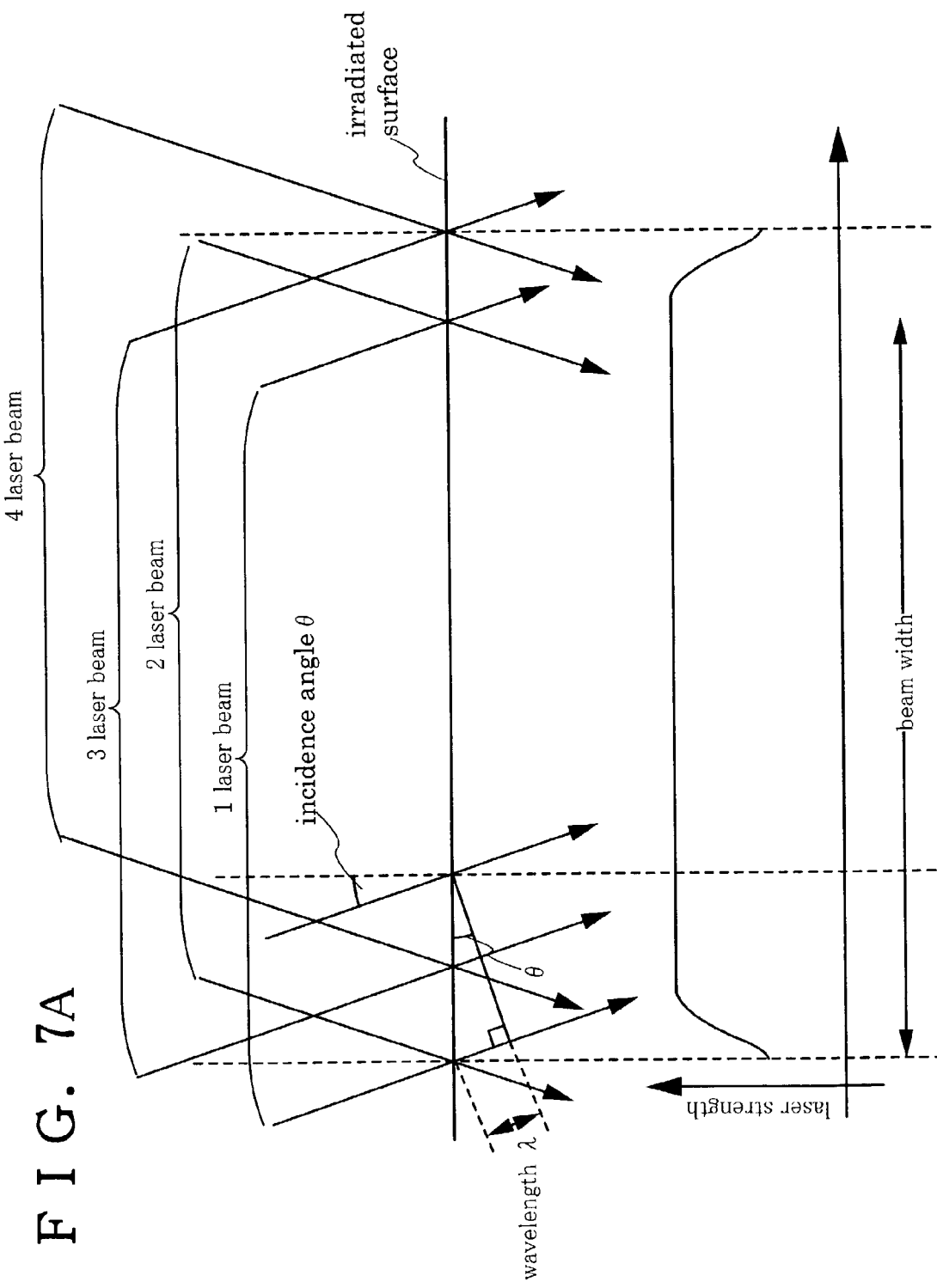

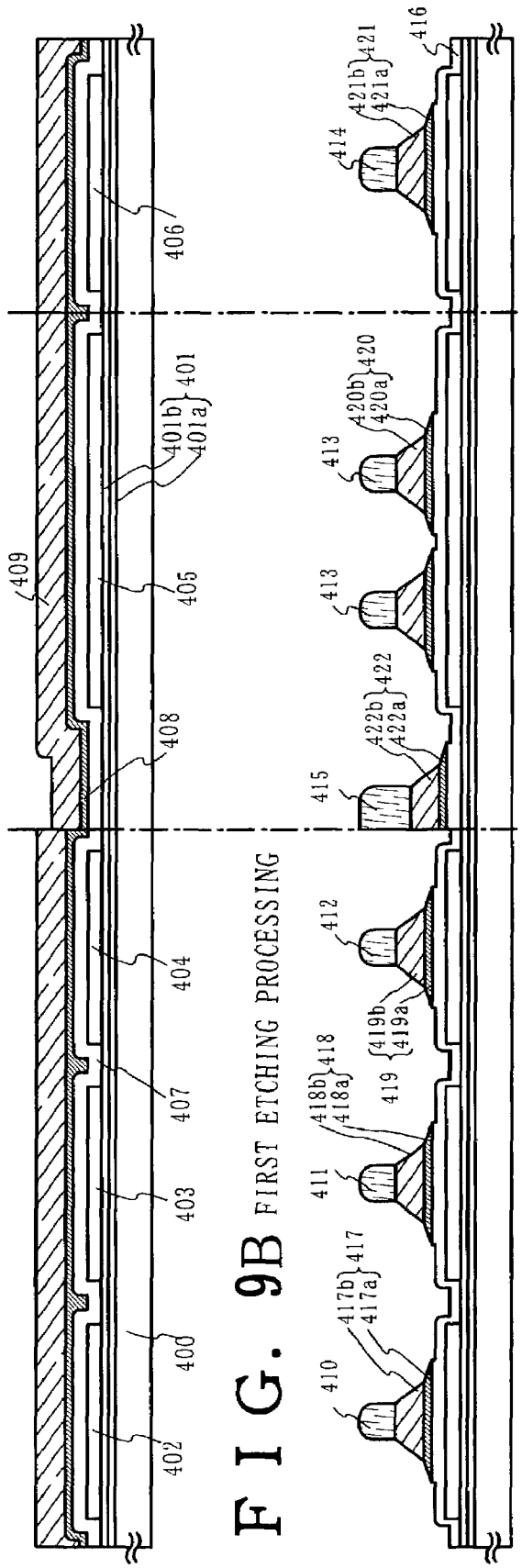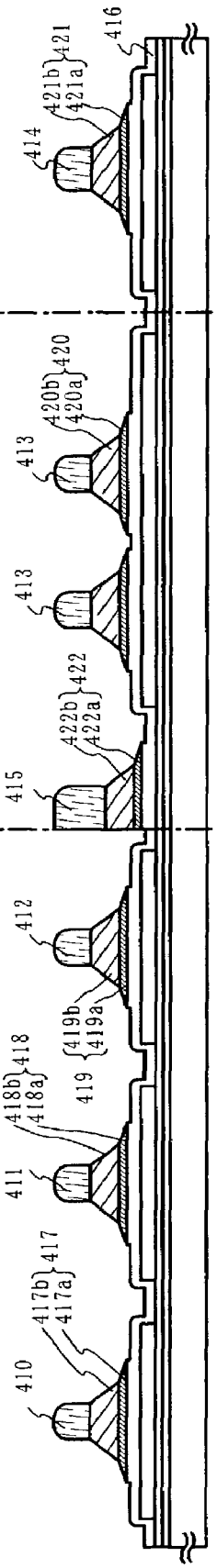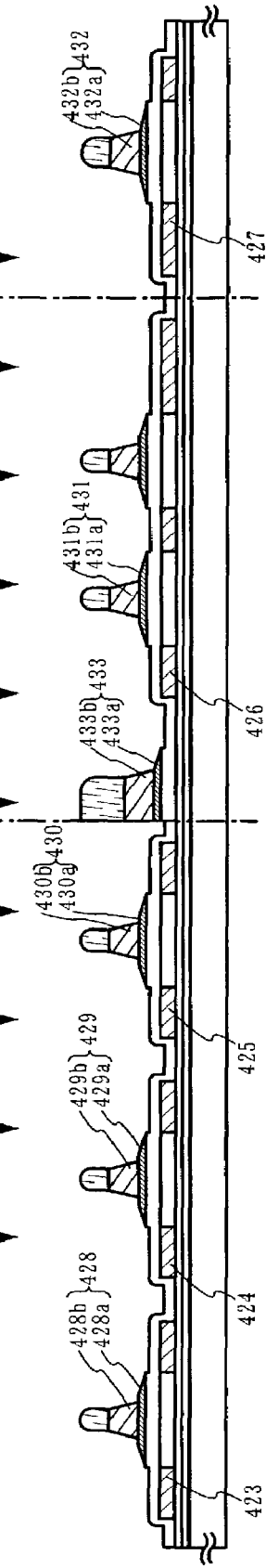

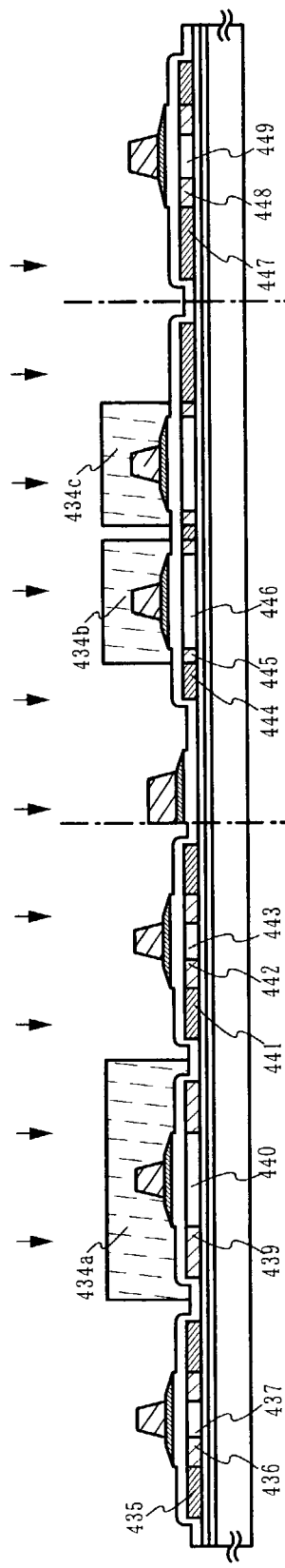
FIG. 10A SECOND DOPING PROCESSING/THIRD DOPING PROCESSING
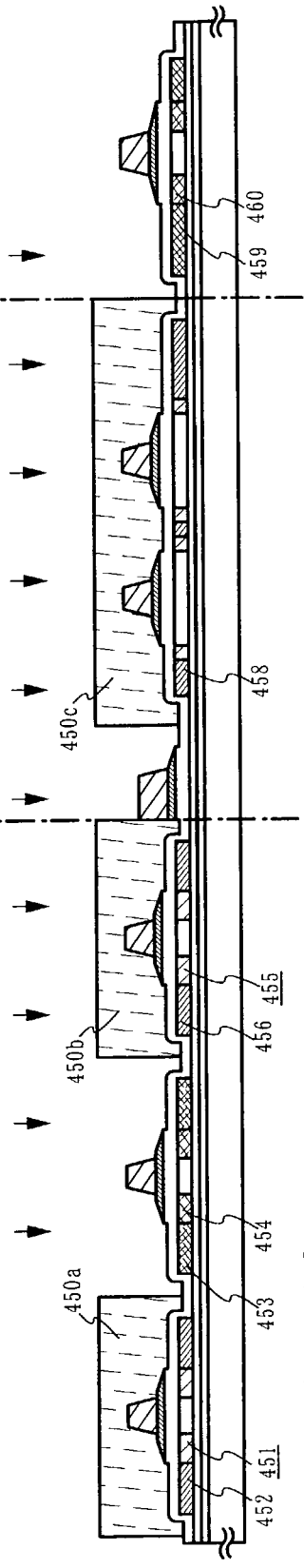
FIG. 10B FOURTH DOPING PROCESSING
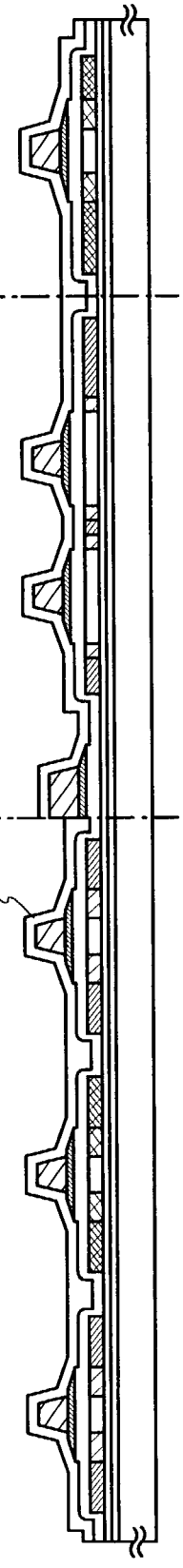
FIG. 10C FIRST INTERLAYER INSULATING FILM/ACTIVATION PROCESSING FIG. 15A
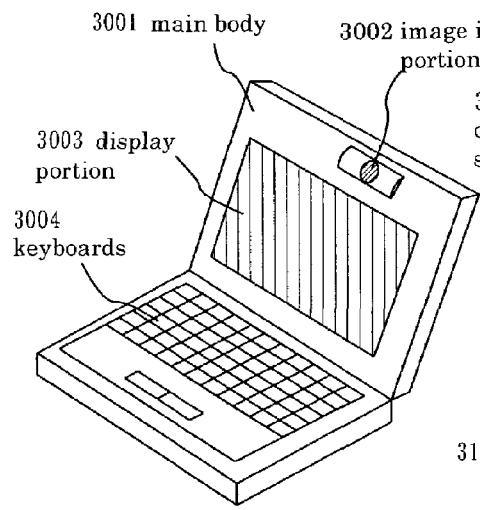
FIG. 15B
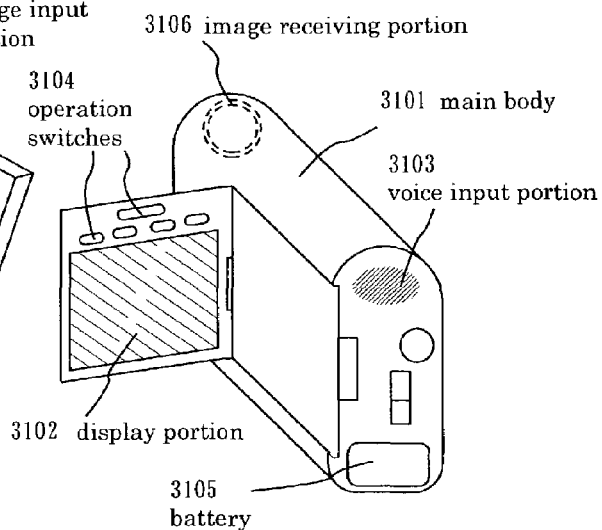
FIG. 15C
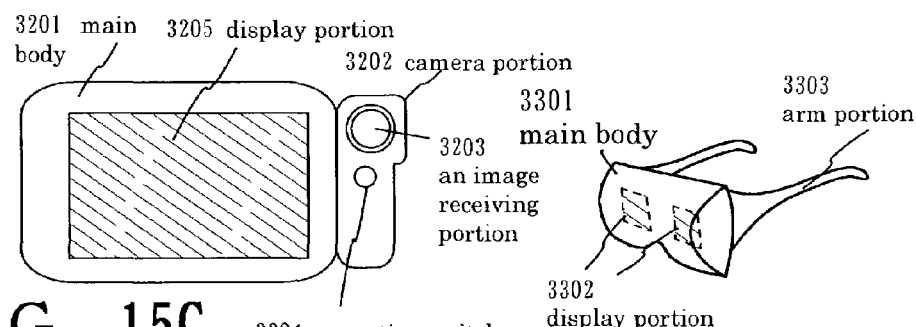
FIG. 15D
FIG. 15E
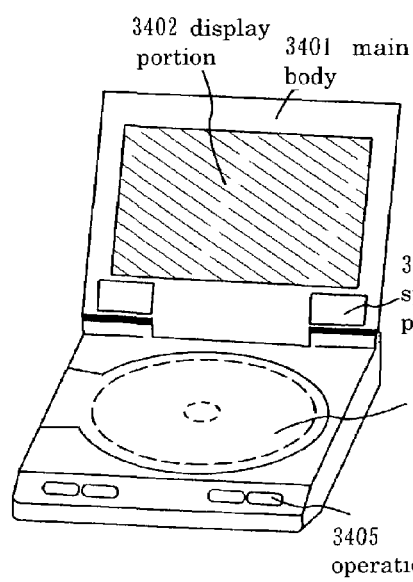
FIG. 15F
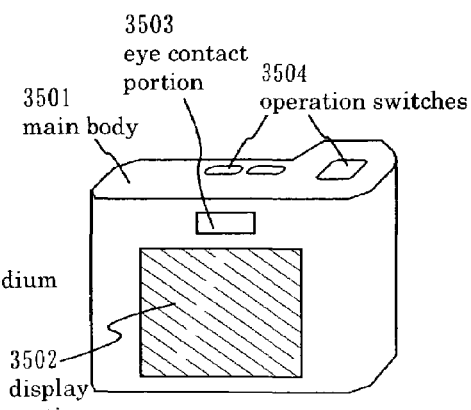

LASER, IRRADIATION APPARATUS, LASER IRRADIATION METHOD, AND METHOD FOR MANUFACTURING SEMICONDUCTOR DEVICE

BACKGROUND OF THE INVENTION

1. Field of the Invention

The present invention relates to a laser irradiation method using a laser beam and a laser irradiation apparatus for performing the laser annealing (apparatus including a laser and an optical system for guiding a laser beam output from the laser to a member to be processed). Further, present invention relates to a method of manufacturing a semiconductor device fabricated by the steps including the laser annealing step. Note that the semiconductor device mentioned through the specification includes an electro-optical device such as a liquid crystal display device or a light emitting device and an electronic device including the electro-optical device as its component.

2. Description of the Related Art

In recent years, a wide range of researches have been made as to the art of applying laser annealing to a semiconductor film formed on an insulating substrate such as a glass substrate to crystallize the semiconductor film or to improve the crystallinity thereof. Incidentally, in the present specification, a crystalline semiconductor film assumes a semiconductor film having a crystalline region including a semiconductor film that entire surface is crystallized.

As compared with synthetic quartz glass substrates, glass substrates have the advantages of being inexpensive and rich in workability and of facilitating fabrication of large-area substrates. The reason why lasers are preferentially used for crystallization is that the melting points of glass substrates are low. Lasers can give high energy to semiconductor films without increasing the temperatures of substrates to a great extent. In addition, lasers are remarkably high in throughput compared to heating means using electric heating furnaces.

Since a crystalline semiconductor film formed by the application of laser annealing has high mobility, the crystalline silicon film is used to form thin film transistors (TFTs). For instance, the thin film transistors are widely used in an active matrix type liquid crystal display device in which TFTs for pixel portion and TFTs for pixel portion and driving circuits are fabricated on one glass substrate.

A laser beam oscillated from an excimer laser or the like is often used as the laser beams. The excimer laser has the advantages of can be high output and irradiate repetitively at a high frequency. Further, laser beams emitted from the excimer laser has the advantages of having a high absorption coefficient with respect to silicon films, which is often used as a semiconductor film. In the laser irradiation, a method in which a laser beam is formed by an optical system so as to have a rectangular shape on an irradiation surface or on an periphery thereof, and then irradiation of laser beam is performed as moving the laser beam (or the irradiation position of the laser beam is made to move relative to the irradiation surface) is preferably used because it has good productivity and is industrially superior. Note that, in this specification, a laser beam having a rectangular shape on an irradiation surface or a periphery thereof is called a rectangular shape beam and a laser beam having a dot shape is called a dot shape beam.

In the other hand, the use of large-area substrat is advanced increasingly. The reason is why a semiconductor device such as a plurality of liquid crystal display device panels is fabricated by using a large-area substrate is that high throughput is obtained and the reduction of the cost can be realized. For instance, a substrate of 600 mm×720 mm, a circular substrate of 12 inches (approximately 300 nm in diameter) or the like are used as the large-areas substrate. In addition, it is thought that a substrate of 1 m×1 m or more is be used in the future.

To form the laser beam, KrF (of wavelength 248 nm) and XeCl (of wavelength 308 nm) are used as exciting gases with respect to the excimer laser used for a laser annealing in general. However, gases such as Kr (krypton) and Xe (xenon) are very expensive and encounter the problem that as the frequency of gas replacement becomes higher, a greater increase in manufacturing cost is incurred.

Attachments such as a laser tube for effecting laser oscillation and a gas purifier for removing unnecessary compounds generated in an oscillation process need to be replaced every three or six years. Many of these attachments are expensive, resulting in a similar problem of an increase in manufacturing cost.

As described above, a laser irradiation apparatus using an excimer laser beam surely has high performance, but needs extremely complicated maintenance and also has the disadvantage that if the laser irradiation apparatus is used as a production-purpose laser irradiation apparatus, its running costs (which mean costs occurring during operation) become too high.

Therefore, it is thought that laser annealing of a semiconductor film is performed by using a solid state laser that the maximum output is highly improved recently. The solid state laser is basically capable of outputting laser beam provided that a solid state crystal, a resonance mirror, and a light source for exciting the solid state crystal are present, and therefore there is very little maintenance time and effort compared to excimer lasers. Namely, the running cost is extremely low compared to that of an excimer laser, and therefore it becomes possible to greatly lower the manufacturing costs of semiconductor devices. Further, the availability ratio of a mass production line is increased if the amount of maintenance decreases, and therefore the overall throughput in the manufacturing process increases. This also greatly contributes to a reduction in the manufacturing costs of semiconductor deices. In addition, the surface area occupied by the solid state laser is small compared to that occupied by excimer lasers, and this is advantageous in design of the manufacturing line.

Furthermore, a YAG laser (normally means Nd: YAG laser), a $YVO_4$ laser, a YLF laser, a $YAlO_3$ laser, a glass laser, a ruby laser, an alexandride laser, a Ti:sapphire laser, etc. are used as this solid laser. A YAG laser is explained as an example of the solid laser here. It is known that the YAG laser outputs a laser beam having a wavelength of 1065 nm as the fundamental wave. The absorption coefficient of this laser beam with respect to silicon films is extremely low, and therefore the laser beam as it is cannot be used in the crystallization process of the amorphous silicon film, which is one of the silicon films because of the large energy loss and bad efficiency. However, the laser beam can be modulated into having a shorter wavelength by using a non-linear optical element. Due to the modulated wavelengths, the laser beam is named a second harmonic (wavelength 532 nm), a third harmonic (wavelength 355 nm), a fourth harmonic (wavelength 266 nm), and a fifth harmonic (wavelength 213 nm). The absorption coefficients of these harmonics with respect to amorphous silicon films are very high, and therefore these harmonics are used for crystallization of the amorphous silicon films.

SUMMARY OF THE INVENTION

However, the YAG laser is a coherent light having an extremely high coherence. The excimer laser has a coherent length of several micrometers to tens of micormeters whereas the YAG laser has a coherent length of about 10 mm or more. Therefore, even though the laser beams are focused on an irradiation surface or place in the vicinity thereof, a laser light with a uniform energy distribution cannot be formed due to the influence of interference. As a result, a uniform annealing with laser light cannot be accomplished.

In view of the foregoing, it is an object of the invention to provide a method for efficiently irradiating the laser light on the overall irradiation surface even when a laser having a high coherence or a large size substrate is used, as well as to provide a laser irradiation apparatus for carrying out the method. It is another object of the invention to provide a method for fabricating a semiconductor device from a semiconductor film obtained by crystallizing the semiconductor film or activating impurity elements therein according to such a laser irradiation method.

A constitution of the invention related to the laser irradiation apparatus disclosed herein comprises: a laser; dividing means for dividing a laser light emitted from the laser into a plurality of laser beams; means for forming a laser light having a periodical energy distribution by synthesizing the plural laser beams on an irradiation surface or place in the vicinity thereof, and means for moving a substrate relative to the laser light.

Another constitution of the invention related to the laser irradiation apparatus disclosed herein comprises a laser; a first optical system for dividing a laser light emitted from the laser into a plurality of laser beams; and a second optical system for synthesizing the laser beams divided by the first optical system thereby forming, on an irradiated surface, a laser light having a periodical energy distribution, wherein the first optical system is disposed between the laser and the second optical system.

A still another constitution of the invention related to the laser irradiation apparatus disclosed herein and designed to irradiate an irradiated surface with a laser light emitted from a laser, the apparatus comprises a first optical system and a second optical system, wherein the second optical system is disposed in a manner to superimpose light axes of laser beams on each other on the irradiated surface, the laser beams divided by the first optical system, and wherein the laser light emitted from the laser and passing through the first optical system and the second optical system presents a periodical energy distribution on the irradiated surface.

In the above constitution of the invention, the laser is a solid state laser of a continuous wave type or a pulse oscillation type. Examples of the solid state laser include YAG laser, $YVO_4$ laser, YLF laser, $YAlO_3$ laser, glass laser, ruby laser, alexandrite laser, Ti:sapphire laser and the like.

In the above constitution of the invention, the first optical system and the second optical system are disposed in a manner to apply the laser light emitted from the laser to the irradiated surface of a sample in a slanting direction thereto.

In the above constitution of the invention, the periodical energy distribution is produced by the plural laser beams synthesized on the irradiation surface or place in the vicinity thereof and interfering with each other. In the case of a strong interference, however, a difference between a high energy density and a low energy density is so great that a region of the low energy density may not accomplish sufficient annealing. In order to overcome this problem, a first interference produced by at least two of the plural laser beams may be superimposed on a second interference with their phases shifted from each other, the second interference produced by at least two of the other laser beams, so that the energy distributions of the first and second interferences are changed. In this manner, the difference between the high energy density and the low energy density can be adjusted. In short, a laser light with small periodical variations in the energy distribution can be formed by synthesizing the energy distribution of the first interference and that of the second interference. In a case where the first and second interferences have the same energy distribution, it is also possible to form a laser light presenting a uniform energy distribution on the irradiation surface by superimposing the first and second interferences on each other with their phases shifted from each other by a half period.

In the above constitution of the invention, the means for dividing the laser light into the plural laser beams may comprise one selected from the group consisting of a cylindrical lens array, prism and mirror. Otherwise, the means may comprise plural types of the above optical devices in combination for further increasing the number of divided laser beams. The means for dividing the laser light into the plural laser beams in accordance with the present invention is advantageous for homogenizing the laser beam, of which energy distribution is higher in a center portion than in a peripheral portion, for example,the laser beam having a Gaussian distribution.

In the above constitution of the invention, the means for synthesizing the plural laser beams may comprise a mirror or a cylindrical lens, or otherwise a combination of the mirror and the cylindrical lens. The use of the cylindrical lens is preferred because the laser light is reduced in length with respect to one direction so that the energy density on the irradiation surface is increased.

A constitution of the invention related to the laser irradiation method disclosed herein comprises the steps of dividing a laser light into a plurality of laser beams; synthesizing the plural laser beams on an irradiation surface or place in the vicinity thereof for forming a laser light having a periodical energy distribution; and irradiating a substrate with the laser light as moving the substrate relative to the laser light.

Another constitution of the invention related to the laser irradiation method disclosed herein comprises the steps of dividing a light path of a laser light emitted from a single laser into a plurality of light paths by means of a first optical system; irradiating the plurality of divided laser beams on an irradiated surface in a slanting direction thereto by means of a second optical system, thereby synthesizing the laser beams into a laser light presenting a periodical energy distribution on the irradiated surface; and irradiating the resultant laser light on the irradiated surface.

A still another constitution of the invention related to the laser irradiation method disclosed herein comprises the steps of dividing a light path of a laser light emitted from a single laser into a plurality of light paths by means of a first optical system; irradiating the plurality of divided laser beams on an irradiated surface in a slanting direction thereto by means of a second optical system, thereby synthesizing the laser beams into a laser light presenting a periodical energy distribution along a first direction of the irradiated surface; and irradiating the laser light on the irradiated surface along the first direction thereof and along a second direction perpendicular to the first direction.

In the above constitution of the invention, the laser light is emitted from a solid state laser of a continuous wave type or a pulse oscillation type. Examples of the solid state laser include YAG laser, YVO$_4$ laser, YLF laser, YAlO$_3$ laser, glass laser, ruby laser, alexandrite laser, Ti:sapphire laser and the like.

In the above constitution of the invention, the periodical energy distribution is produced by the plural laser beams synthesized on the irradiation surface or place in the vicinity thereof and interfering with each other.

In the above constitution of the invention, the means for dividing the laser light into the plural laser beams may comprise one selected from the group consisting of a cylindrical lens array, prism and mirror. Otherwise, the means may comprise plural types of the above optical devices in combination for further increasing the number of divided laser beams. The means for dividing the laser light into the plural laser beams in accordance with the present invention is advantageous for homogenizing the laser beam, of which energy distribution is higher in a center portion than in a peripheral portion, for example, the laser beam having a Gaussian distribution.

In the above constitution of the invention, the means for synthesizing the plural laser beams may comprise a mirror or a cylindrical lens, or a combination of the mirror and the cylindrical lens.

A constitution of the invention related to the method for fabricating a semiconductor device disclosed herein comprises the steps of dividing a laser light into a plurality of laser beams; synthesizing the plural laser beams on an irradiation surface or place in the vicinity thereof for forming a laser light having a periodical energy distribution; and irradiating a semiconductor film with the laser light as moving the semiconductor film relative to the laser light.

In the above constitution of the invention, the laser light is emitted from a solid state laser of continuous wave type or a pulse oscillation type. Examples of the solid state laser include YAG laser, YVO$_4$ laser, YLF laser, YAlO$_3$ laser, glass laser, ruby laser, alexandrite laser, Ti:sapphire laser and the like.

In the above constitution of the invention, the periodical energy distribution is produced by the plural laser beams synthesized on the irradiation surface or place in the vicinity thereof and interfering with each other.

In the above constitution of the invention, the means for dividing the laser light into the plural laser beams may comprise one selected from the group consisting of a cylindrical lens array, prism and mirror. Otherwise, the means may comprise plural types of the above optical devices in combination for further increasing the number of divided laser beams. The means for dividing the laser light into the plural laser beams in accordance with the present invention is advantageous for homogenizing the laser beam, of which energy distribution is higher in a center portion than in a peripheral portion, for example, the laser beam having a Gaussian distribution.

In the above constitution of the invention, the means for synthesizing the plural laser beams may comprise a mirror or a cylindrical lens, or a combination of the mirror and the cylindrical lens.

BRIEF DESCRIPTION OF THE DRAWINGS

FIG. 2 is a diagram showing an example of the interference of laser beams on an irradiation surface according to the invention;

FIG. 4 is a diagram showing an exemplary arrangement of a laser irradiation apparatus according to the invention;

FIG. 7 is a diagram showing an example of the interference of laser beams on the irradiation surface according to the invention;

FIGS. 9A, 9B and 9C are sectional views showing the steps of forming a pixel TFT and a TFT of a drive circuit;

FIGS. 10A, 10B and 10C are sectional views showing the steps of forming the pixel TFT and the TFT of the drive circuit;

FIGS. 15A to F are diagrams showing examples of semiconductor devices;

DETAILED DESCRIPTION OF THE INVENTION EMBODIMENTS

Embodiment Mode

A preferred embodiment of the invention will be described in detail with reference to FIGS. 1 to 3.

Figure 1:
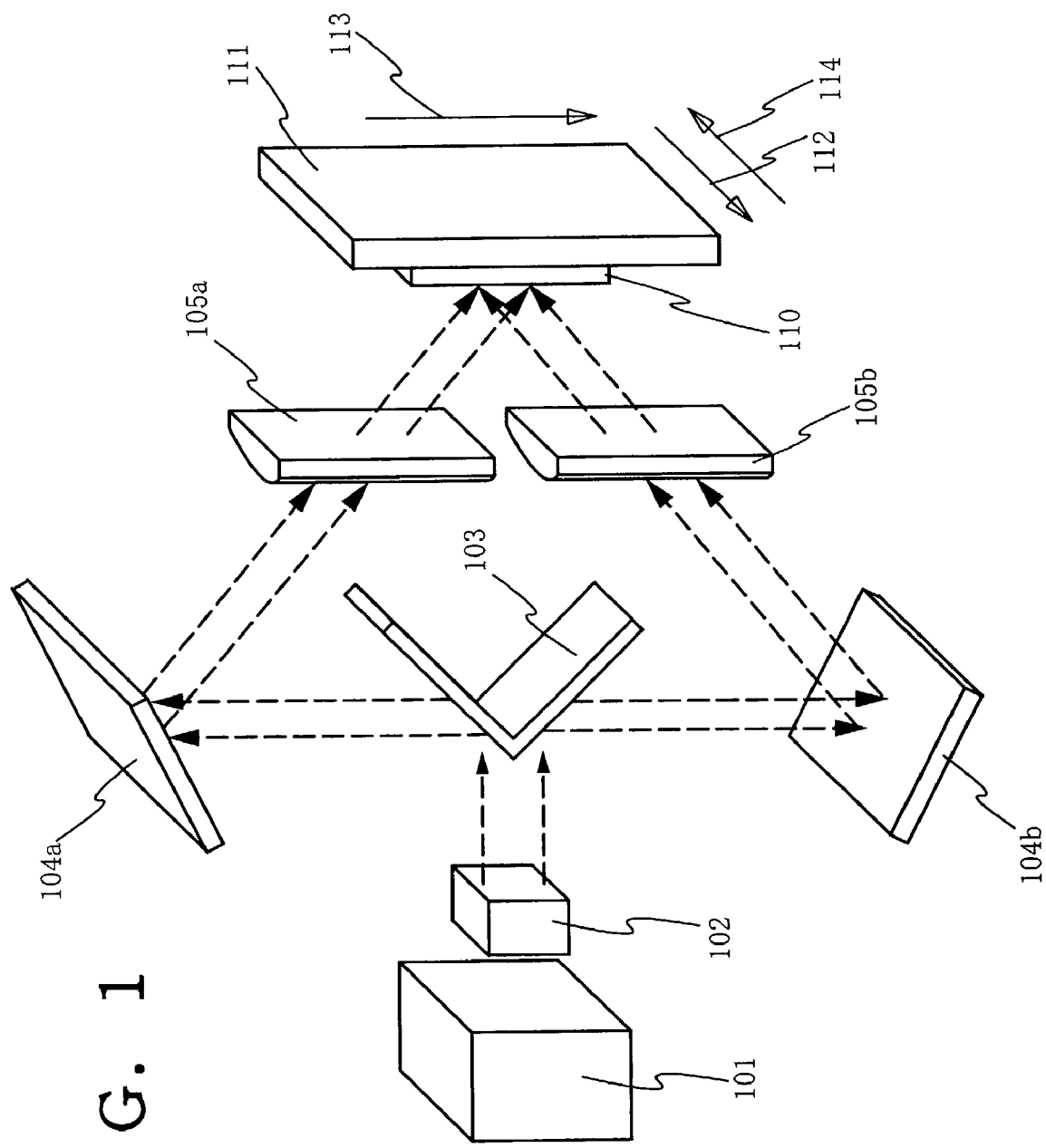
FIG. 1 is a diagram showing an exemplary arrangement of a laser irradiation apparatus according to the invention.

FIG. 1 illustrates an example of a laser irradiation apparatus according to the invention. A laser light emitted from a laser 101 is converted into a harmonic by a nonlinear optical device 102 and then divided into a plurality of laser beams by means of a mirror 103 as dividing means. The laser beams are each reflected by a mirror 104a, 104b as means for forming a laser light having a periodical energy distribution, so as to reach a substrate 110. On the substrate 110, the plural laser beams are synthesized as interfering with each other so that the laser light having the periodical energy distribution is formed. The substrate 110 is disposed on a movable stage 111 as means for moving the substrate relative to the laser light. By moving the stage 111, even a substrate of a large size can be irradiated with the laser light. Cylindrical lenses 105a, 105b may preferably be disposed for increasing the energy density on an irradiation surface.

The shape of the laser light emitted from the laser varies depending upon the types of the laser. If the laser comprises a rod, a circular beam is emitted. If the laser comprises a slab, a rectangular beam is emitted.

Now referring to FIGS. 2A, B, description is made on how the laser beams interfere with each other on the irradiation surface.

As shown in FIG. 2A, an interference occurs when plural laser beams are superimposed on each other on the irradiation surface. At this time, a distribution of the energy density assumes a periodical wave form, as shown in FIG. 2B, wherein a portion of high energy density and a portion of low energy density alternate with each other. Focusing only on the portions of high energy density, the laser light may be regarded as a plurality of spot-like laser beams arranged in a line. If the irradiation is performed using such a laser light, much more efficient laser irradiation can be accomplished than a case where one spot-like laser beam is used. The irradiation with such a laser light is particularly advantageous in a case where a semiconductor film is annealed with a laser light of high energy density emitted from a high power laser. Where a laser light having a high coherence is used, such a laser irradiation is quite effective because the laser light is adapted to cause interference on the irradiation surface thereby to form a periodical distribution of energy density.

As shown in FIG. 2A, the plural laser beams are incident on the irradiation surface in a symmetrical manner. Therefore, a laser beam 1 is reflected to take a light path along which a laser beam 2 is incident on the irradiation surface, whereas the laser beam 2 is reflected to take a light path along which the laser beam 1 is incident on the irradiation surface. That is, the individual reflected beams behave like a return light and hence, there is a fear of adverse effects which include variations in the output or frequency of the laser, rod destruction and the like. In this connection, it is preferred to provide an isolator for removing the reflected light and stabilizing the laser output. For instance, the reflected light can be removed by the isolator disposed between the nonlinear optical device 102 and the mirror 103.

Figure 3A:
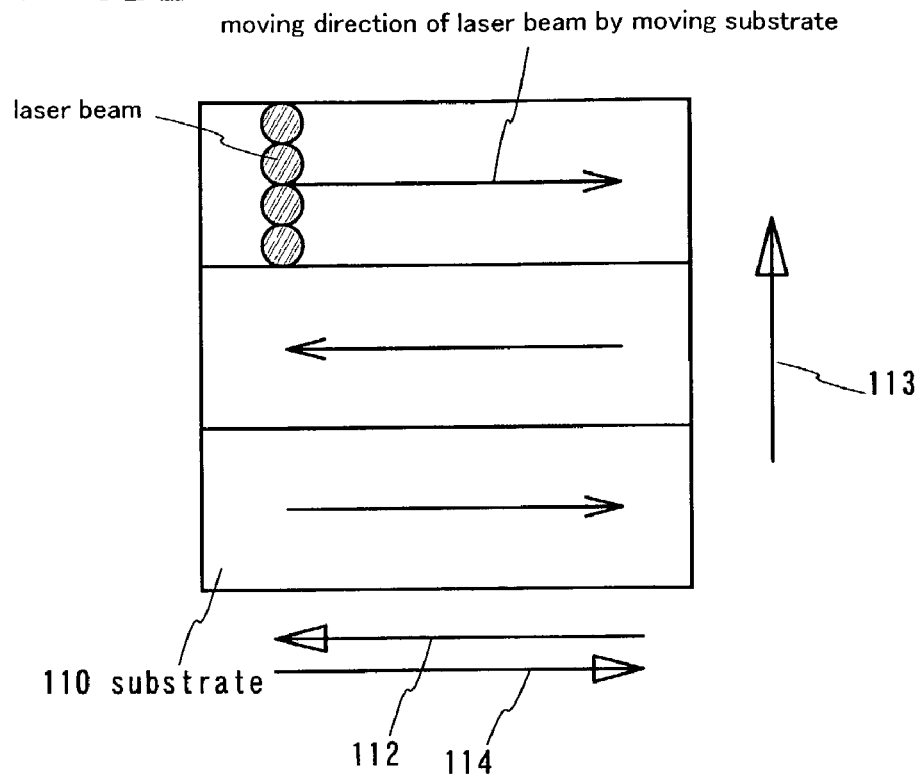
FIGS. 3A and 3B are diagrams showing an exemplary method for moving a substrate on the irradiation surface according to the invention.

Next, a method for irradiating such a laser light on the overall surface of the substrate will be described with reference to FIGS. 3A, B.

Figure 3B:
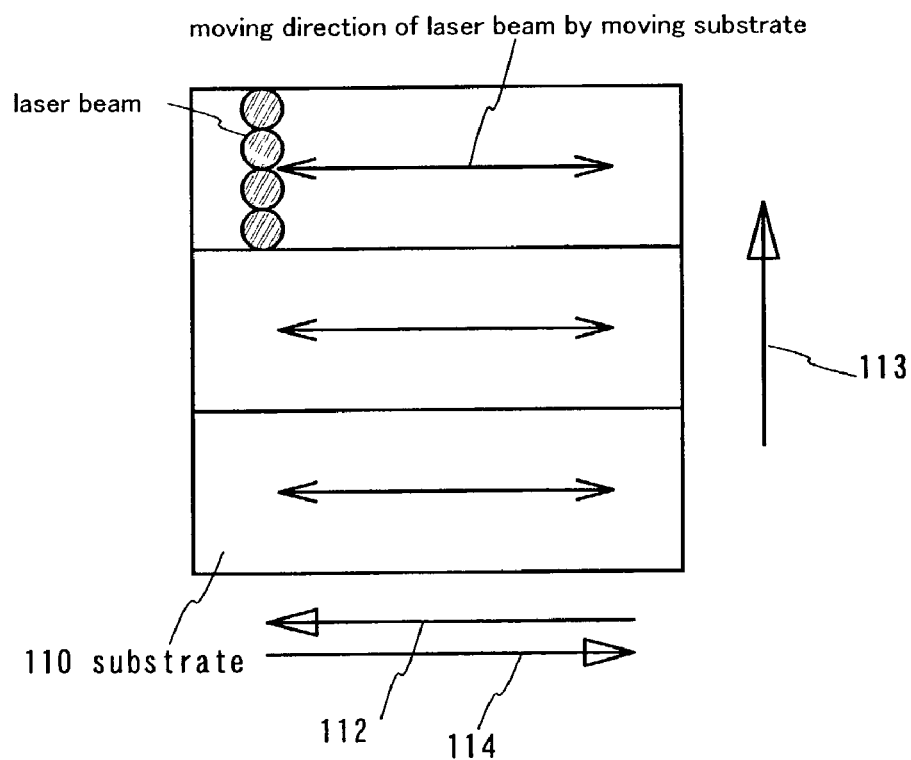

The substrate 110 (or the stage 111 shown in FIG. 1) is moved relative to the laser light in a direction indicated at 112, and then in a direction indicated at 113. By repeating the operations in cycles, the laser light can be irradiated on the overall surface of the substrate 110 (FIG. 3A). Alternatively, the substrate 110 (or the stage 111 shown in FIG. 1) may be moved relative to the laser light in the direction indicated at 112 and then in a direction indicated at 114 and then moved in the direction indicated at 113. Otherwise, the operations of moving the substrate 110 (or the stage 111 shown in FIG. 1) relative to the laser light in the direction indicated at 112 and then in the direction indicated at 114 may be repeated in a few cycles and followed by moving the substrate in the direction indicated at 113 (FIG. 3B). It is of course possible to irradiate the laser light on the overall surface of the substrate by moving the laser light.

Next, description will be made on a case where a semiconductor film is crystallized using this irradiation method. When the laser light is irradiated on the semiconductor film, an irradiated region thereof becomes molten and is allowed to cool to solidify with the passage of time. If the irradiation is performed while moving the laser light, the molten regions are produced one after another while on the other hand, there are also regions in which the molten mass is cooled and solidified with the passage of time. That is, a thermal gradient is formed in the semiconductor film so that crystal grains grow along the direction of movement of the laser light, forming parallel lines of crystal grains of great size.

A dramatic improvement in the performance of a semiconductor device can be achieved by forming a crystalline semiconductor film wherein crystal grains of large size are arranged in parallel. Explaining by way of an example of TFT, the crystal grains of large size formed in parallel contribute to the reduction of the number of crystal grain boundaries included in a channel forming region. That is, the number of passages of a carrier across the crystal grain boundaries can be reduced so much that the TFT can achieve a mobility (field effect mobility) equal to or greater than that of a transistor employing a monocrystalline semiconductor. This also leads to the possibility for reducing the variations in the ON current value (a value of drain current through the TFT in ON state), the OFF current value (a value of drain current through the TFT in OFF state), the threshold voltage, the S value and the field effect mobility. Thus, the TFT is improved in the electrical characteristics and besides, the semiconductor device is also improved in the operation characteristics and reliability. Incidentally, it is preferred to fabricate a TFT having a channel region formed in parallel with the moving direction of the laser light because very few crystal grain boundary exists in this direction.

Furthermore, it is preferred that a crystal grain width is matched with a pitch p of the interference produced by the plurality of divided laser beams since the crystal grains are formed by irradiating the laser light on the overall surface of the semiconductor film. Provided that a wavelength of the laser light is represented by $\lambda$ and an incidence angle is represented by $\theta$, the following expression is derived from FIG. 2A:

Sin $\theta = \lambda/p$ $\therefore \theta = \arcsin(\lambda/p)$

In a case where, for example, a second harmonic (wavelength: 532 nm) of a YAG laser or $YVO_4$ laser is used and formed crystal grains have a width of 1 to 10 μm, $$\theta = \arcsin(532/1000)$$
$$= 32.14$$

$$\theta = \arcsin(532/10000)$$
$$= 3.05$$

Thus, the incidence angle $\theta$ is determined to range between 3 and 32 degrees.

If the formed crystal grains are not less than 10 μm in width, the crystals suffer cracks so that the possibility of defect increases. On the other hand, if the grains are less than 1 μm in width, the crystal grain boundaries in the film are increased, resulting in the occurrence of leak current. Accordingly, it is preferred that the width of the crystal grains is in the range of 1 to 10 μm.

If such an irradiation method is used, the laser annealing can be performed even on the overall surface of a large size substrate. If the semiconductor film is crystallized by such a laser annealing, there can be formed the semiconductor film wherein crystal grains of large size are arranged in parallel. Accordingly, the crystal grain boundaries are decreased so that the improvement in the mobility (the field effect mobility) as well as the reduction of the variations in the ON current value (the value of drain current through the TFT in ON state), the OFF current value (the value of drain current through the TFT in OFF state), the threshold voltage, the S value and the field effect mobility can be achieved. Consequently, the TFT fabricated using the above semiconductor film is improved in the electrical characteristics while the semiconductor device is also improved in the operation characteristics and reliability.

On the other hand, if the laser light is allowed to become incident on the substrate surface in a perpendicular direction thereto, there occurs a problem that a laser light reflected from a back side of the substrate interferes with an irradiated laser light on the substrate surface so as to form a nonuniform distribution of the energy density which results in the formation of a semiconductor film having a nonuniform crystallinity. However, this problem is solved by applying the laser light to the substrate in a slanting direction thereto. Thus, the semiconductor film having a uniform crystallinity can be formed.

The invention of the aforementioned constitution will be described in more details with reference to the following examples thereof.

Embodiment 1

In this example, a method and apparatus for irradiating the laser light on the overall surface of the substrate will be described with reference to FIG. 1.

It is desirable that the laser light emitted from the laser 101 is converted into a harmonic by means of the nonlinear optical device 102. In this example, a continuous wave YAG laser is employed as the laser 101 whereas the laser light is converted into a second harmonic by means of the nonlinear optical device 102.

The laser light is applied to the mirror 103 which, in turn, divides a light path of the laser light into two directions. The respective laser beams are allowed to become incident on the mirror 104a, 104b. The cylindrical lenses 105a, 105b may preferably be used to reduce the length of the laser beams with respect to one direction. Thus, the energy density of the laser beams can be increased.

Reflected from the mirrors 104a, 104b, the laser beams reach the substrate 110 as the irradiation surface. That is, the laser beams reflected by the mirrors 104a, 104b are superimposed on each other on the substrate 110 as the irradiation surface. As shown in FIG. 2, the laser beams incident on the substrate 110 along two directions interfere with each other to form a periodical energy distribution. The distribution may be regarded as an array of multiple spot-like laser beams, which provides a more efficient laser irradiation than a single spot-like laser light.

Although not shown in the figure, an isolator may preferably be provided in consideration of a fear that each of the reflected beams may take a light path along which the other beam become incident, adversely affecting the laser.

The substrate 110 (or the stage 111 shown in FIG. 1) is moved relative to such laser beams in the direction indicated at 112 and then in the direction indicated at 113. The laser beams can be irradiated on the overall surface of the substrate by repeating these operations in cycles (FIG. 3A). Alternatively, the substrate 110 (or the stage 111 shown in FIG. 1) may be moved relative to the laser beams in the direction indicated at 112 and then in the direction indicated at 114 and then moved in the direction indicated at 113. Otherwise, the operations of moving the substrate 110 (or the stage 111 shown in FIG. 1) relative to the laser beams in the direction indicated at 112 and then in the direction indicated at 114 may be repeated in a few cycles and followed by moving the substrate in the direction indicated at 113 (FIG. 3B). Of course, it is possible to irradiate the laser beams on the overall surface of the substrate by moving the laser light.

In this manner, the laser light can be efficiently irradiated on the overall surface of the substrate. The irradiation method may be used for annealing the semiconductor film or activating impurity elements.

Embodiment 2

In this example, a method and apparatus for irradiating the laser light on the overall surface of the substrate will be described with reference to FIG. 4, the example adopting a different method from that of Example 1 for dividing the laser light.

It is desirable that the laser light emitted from the laser 101 is converted to a harmonic by means of the nonlinear optical device 102. In this example, a continuous wave $YVO_4$ laser is employed as the laser 101 whereas the laser light is converted to a third harmonic by means of the nonlinear optical device 102.

The laser light is applied to a prism 121 for dividing a light path of the laser light into two directions such that respective laser beams are allowed to become incident on respective mirrors 122a, 122b. Then, the laser beam may preferably be reduced in length with respect to one direction by means of the cylindrical lens 105a, 105b. In this manner, the energy density can be increased.

Subsequently, the laser beams reach the substrate 110 as the irradiation surface. That is, the laser beams reflected by the mirrors 122a, 122b are superimposed on each other on the substrate as the irradiation surface. This causes the laser beams incident on the substrate 110 along the two directions to interfere with each other so that a periodical energy distribution is produced, as shown in FIG. 2. This state may be regarded as an array of multiple spot-like laser beams, which provides a more efficient laser irradiation than a single spot-like laser beam.

The substrate may be moved in the same way as in Example 1.

In this manner, the laser light can be efficiently irradiated on the overall surface of the substrate. The irradiation method may be used for annealing the semiconductor film or activating the impurity elements.

Embodiment 3

Figure 5:
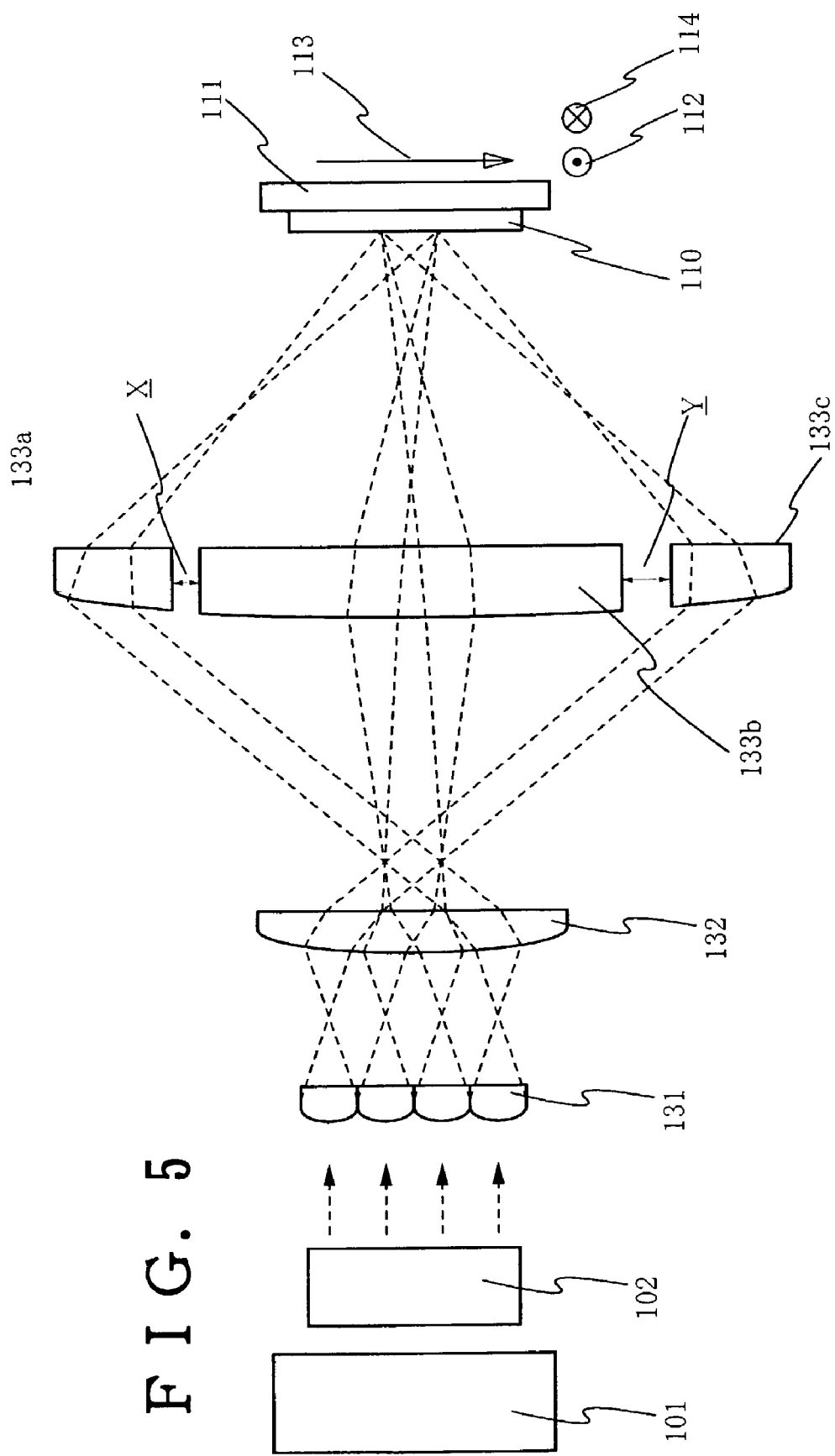
FIG. 5 is a diagram showing an exemplary arrangement of a laser irradiation apparatus according to the invention.

In this example, a method and apparatus for irradiating the laser light on the overall surface of the substrate will be described with reference to FIG. 5, the example adopting a different method from those of Examples 1 and 2 for dividing the laser light.

It is desirable that the laser light emitted from the laser 101 is converted to a harmonic by means of the nonlinear optical device 102. In this example, a YLF laser is used as the laser 101 whereas the laser light is converted to the third harmonic by means of the nonlinear optical device 102.

The laser light is divided by applying the light to a cylindrical lens array 131. In this example, the laser light is divided into 4 beams. Subsequently, the laser beams are focused or expanded by means of a cylindrical lens 132. This permits individual laser beams, obtained by dividing the laser light into 4 portions, to travel in different directions (that is, in different laser light paths). Hence, it becomes easy to guide the individual laser beams into different optical devices. The divided laser beams are allowed to enter lenses 133a-133c. The lenses 133a, 133c are disposed in an asymmetrical manner with respect to the lens 133b (specifically, the lenses are disposed in a manner that a distance X between a side face of the lens 133b and the lens 133a is different from a distance Y between a side face of the lens 133b and the lens 133c), whereby an energy distribution of an interference produced on the irradiation surface by the laser beams through the lenses 133a, 133c can be shifted from an energy distribution of an interference produced on the irradiation surface by the two laser beams through the lens 133b. If, on the other hand, the lenses are disposed in a symmetrical manner, it is also possible to increase the difference between the higher energy level and the lower energy level of the energy distribution of the laser beams on the irradiation surface. It is preferred that the lenses 133a, 133c are adapted for movement by way of a micrometer or the like, so as to provide for fine adjustment.

Figures 6A, 6B:
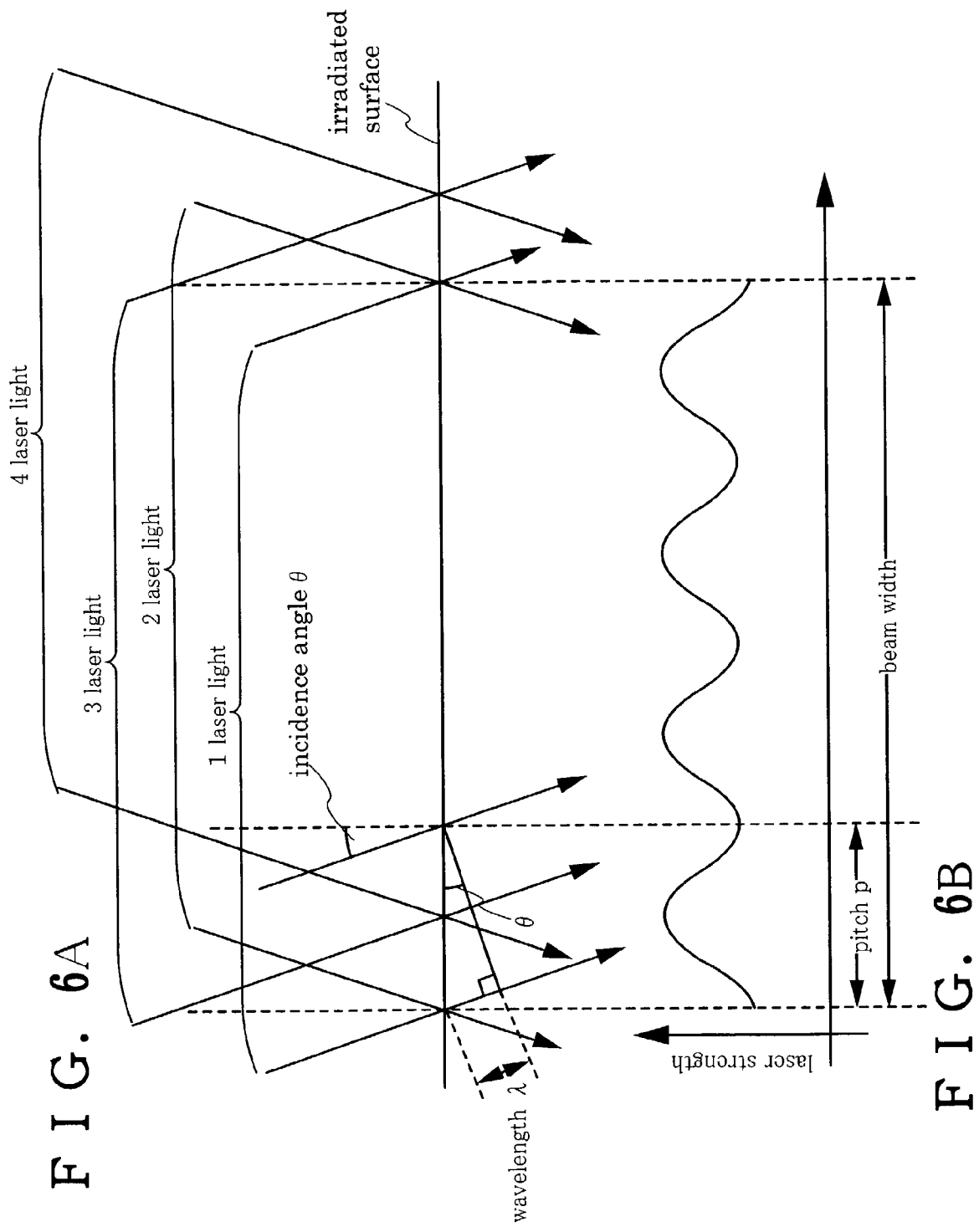
FIG. 6 is a diagram showing an example of the interference of laser beams on the irradiation surface according to the invention.

The two laser beams through the lenses 133a, 133c originate from portions on opposite ends of the laser light emitted from the laser 101 and hence, have a lower energy density than the laser beams through the lens 133b. However, a portion of an extremely low energy density can be prevented from appearing on the irradiation surface by superimposing the energy distribution of the interference produced by the laser beams through the lenses 133a, 133c on that of the interference produced by the two laser beams through the lens 133b with their phases shifted from each other by, for example, a half period (FIGS. 6A-B). Of course, it is also possible to form a laser light with a uniform energy distribution if the individual laser beams are made equal in the energy density and the interference produced by the laser beams through the lenses 133a, 133c is superimposed on the interference produced by the two laser beams through the lens 133b with their phases shifted from each other by a half period (FIGS. 7A-B).

Incidentally, a cylindrical lens may be disposed between the lenses 133a-133c and the substrate 110.

It is noted that the substrate may be moved the same way as in Example 1.

In this manner, the laser light can be efficiently irradiated on the overall surface of the substrate. The irradiation method may be used for annealing the semiconductor film or activating the impurity elements.

In this example, the laser beams are focused or expanded by means of the cylindrical lens 132 and then are focused by means of the lens 133. However, the lens 132 may be used to cause the plural laser beams to interfere with each other.

Embodiment 4

Figure 8:
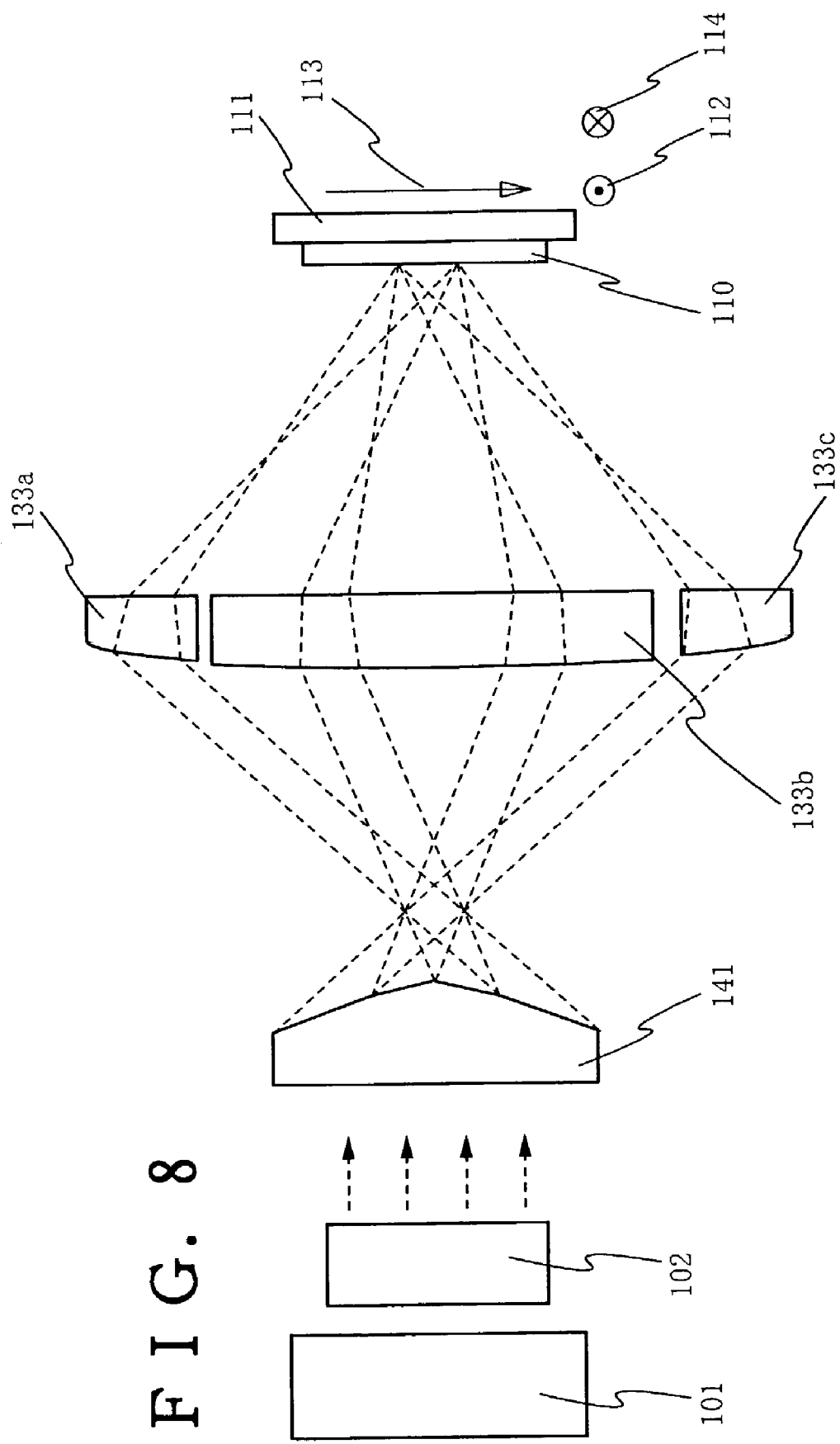
FIG. 8 is a diagram showing an example of the interference of laser beams on the irradiation surface according to the invention.

In this example, a method and apparatus for irradiating the laser light on the overall surface of the substrate will be described with reference to FIG. 8, the example adopting a different method from those of Examples 1 to 3 for dividing the laser light.

It is desirable that the laser light emitted from the laser 101 is converted to a harmonic by means of the nonlinear optical device 102. Examples of a usable laser 101 include lasers of continuous wave type and pulse oscillation type, such as YAG laser, YVO$_4$ laser, YLF laser, YAlO$_3$ laser, glass laser, ruby laser, alexandrite laser, Ti:sapphire laser and the like. This example employs a YLF laser whereas the laser light is converted to the second harmonic.

Then, the laser light is divided by applying the light to a prism 141. In this example, the laser light is divided into 4 beams. The prism 141 plays the same role that is played by the combination of the cylindrical lens array 131 and the cylindrical lens 132 which are employed by Example 3. The number of optical devices can be reduced from 2 to 1 by employing the prism 141 and hence, the light transmittance can be increased. In addition, there is an advantage that the length of the light path is shorter than that of the system of Embodiment 3. The system of a shorter light path is particularly advantageous in a case where the system is installed in a clean room of an extremely high cost per unit area. The divided laser beams are allowed to enter the lenses 133a-133c. The lenses 133a, 133c are disposed in an asymmetrical manner with respect to the lens 133b. That is, the lenses are disposed at such places that a distance between the lenses 133a and 133b is different from a distance between the lenses 133c and 133b, whereby the interference produced on the irradiation surface by the laser beams through the lenses 133a, 133c is shifted from the interference produced by the two laser beams through the lens 133b. If, on the other hand, the lenses are disposed in a symmetrical manner, it is also possible to increase the difference between the higher energy level and the lower energy level of the energy distribution of the laser beams on the irradiation surface. It is preferred that the lenses 133a, 133c are adapted for movement by way of a micrometer or the like, so as to provide for fine adjustment.

The two laser beams through the lenses 133a, 133c originate from the portions on the opposite ends of the laser light emitted from the laser 101 and hence, have a lower energy density than the laser beams through the lens 133b. However, the portion of an extremely low energy density can be prevented from appearing on the irradiation surface by superimposing the interference produced by the laser beams through the lenses 133a, 133c on the interference produced by the two laser beams through the lens 133b with their phases shifted from each other by, for example, a half period (FIG. 6). Of course, it is also possible to form a laser light with a uniform energy density if the individual laser beams are made equal in the energy density and the interference produced by the laser beams through the lenses 133a, 133c is superimposed on the interference produced by the two laser beams through the lens 133b with their phases shifted from each other by a half period (FIGS. 7A-B).

Incidentally, a cylindrical lens may be disposed between the lenses 133a-133c and the substrate 110.

It is noted that the substrate may be moved the same way as in Example 1.

In this manner, the laser light can be efficiently irradiated on the overall surface of the substrate. The irradiation method may be used for annealing the semiconductor film or activating the impurity elements.

Embodiment 5

In this embodiment, a method of manufacturing an active matrix substrate will be described with reference to FIGS. 9-12. A substrate on which a CMOS circuit, a driver circuit, and a pixel portion having a TFT pixel and a holding capacity are formed together is called active matrix substrate for convenience.

First of all, a substrate 400 formed of glass such as barium borosilicate glass and aluminum borosilicate glass is used in this embodiment. The substrate 400 may be a quartz substrate, a silicon substrate, a metal substrate or stainless substrate, which has an insulating film on the surface. The substrate 400 may be a plastic substrate having heat resistance, which withstands a processing temperature in this embodiment.

Next, a base film 401 having an insulating film such as silicon oxide film, silicon nitride film, and a silicon oxynitride film is formed on the substrate 400 by publicly known method (such as the sputtering method, LPCVD method and plasma CVD method). In this example, a two-layer structure is used for the base film 401. However, a structure may be used where a single layer film, which is the insulating film itself, or at least two layers are stacked.

Next, semiconductor layers are formed on the base film 401. First of all, semiconductor film is formed with a thickness of 25 to 80 nm (preferably 30 to 60 nm) by publicly known method (such as the sputtering method, LPCVD method and plasma CVD method). Then, the semiconductor film is crystallized by laser crystallization method. By applying any one of embodiments 1 to 4 as the laser crystallization method, a laser beam emitted from the laser is divided into a plurality of laser beams by an optical system, the divided laser beams are synthesized so as to produce an interference, thereby irradiating the semiconductor film. Of course, in addition to the laser crystallization method, the semiconductor film is crystallized by a publicly known crystallization method (such as thermal crystallization method using RTA or a furnace annealing and thermal crystallization method using a metal element facilitating the crystallization). Patterning is performed on the obtained crystalline semiconductor film in a desired form in order to form the semiconductor layers 402 to 406. The semiconductor film may be an amorphous semiconductor film, a fine crystal semiconductor film or a crystalline semiconductor film. Alternatively, the semiconductor film may be a compound semiconductor film having an amorphous structure such as an amorphous silicon germanium film.

In this embodiment, plasma CVD method is used to form an amorphous silicon film with a thickness of 55 nm. A laser beam emitted from $YVO_4$ laser of continuous oscillation type with output of 10 W is modulated to the second harmonic by non-linear optical element. Then, the laser beam is divided into a plurality of laser beams by optical system as shown in any one of embodiments 1 to 4, the plurality of laser beams are synthesized on the substrate in order to produce an interference. Although the distribution of an energy density shows a wave form at this moment, a laser beams having an energy density of 150 mj/cm² or more (preferably 200 mj/cm² or more) at a peak is required. Then, laser light is irradiated to form a crystalline silicon film as moving a stage at a speed of 10 to 200 cm/s. The semiconductor layers 402 to 406 are formed by performing patterning processing thereon by using the photolithography method.

After the semiconductor layers 402 to 406 are formed, a small amount of impurity element (boron or phosphorus) may be doped in order to control a threshold value of the TFT.

Next, a gate insulating film 407 covering the semiconductor layers 402 to 406 is formed. The gate insulating film 407 is formed by using an insulating film with a thickness of 40 to 150 nm containing silicon by using plasma CVD method or sputtering method. In this embodiment, a silicon oxynitride film (compositional ratio: Si=32%, O=59%, N=7% and H=2%) with a thickness of 110 nm is formed in accordance with the plasma CVD method. Notably, the gate insulating film is not limited to the silicon oxynitride film but an insulating film containing other silicon may be used as a single layer or as a laminated pad.

When a silicon oxide film is used, it is formed by mixing Tetraethyl Orthosilicate (TEOS) and $O_2$ by plasma CVD method, which is discharged under a condition with reaction pressure of 40 Pa, a substrate temperature of 300 to 400° C. and high frequency (13.56 MHz) power density of 0.5 to 0.8 W/cm². Thermal annealing at 400 to 500° C. thereafter can give good characteristics to the silicon oxide film produced in this way as a gate insulating film.

Next, a first conductive film 408, which is 20 to 100 nm in thickness, and a second conductive film 409, which is 100 to 400 nm in thickness, is stacked on the gate insulating film 407. In this embodiment, the first conductive film 408 formed by a TaN film with a thickness of 30 nm and the second conductive film 409 formed by a W film with a thickness of 370 nm are stacked. The TaN film is formed by using Ta target to perform sputtering in an atmosphere containing nitrogen. The W film is formed by using W target to perform sputtering. Alternatively, it can be formed by thermal CVD method using tungsten hexafluoride ($WF_6$). In both cases, the use of the gate electrode needs low resistance. Therefore, the resistivity of the W film is desirably 20 μΩcm or below. The low resistance of the W film can be achieved by increasing the size of the crystal grains. However, when the W film contains a large amount of impurity element such as oxygen, the crystallization is inhibited, which raises the resistance. Accordingly, in this embodiment, the W film is formed by the sputtering method using high purity (purity of 99.9999%) W target and by taking the prevention of intrusion of impurity from a vapor phase during the film forming into special consideration. Thus, the resistivity of 9 to 20 μΩcm can be achieved.

While, in this example, the first conductive film 408 is TaN and the second conductive film 409 is W, they are not limited in particular. Both of them can be formed by an element selected from Ta, W, Ti, Mo, Al, Cu, Cr and Nd or an alloy material or a compound material mainly containing the element. Alternatively, a semiconductor film, such as a polycrystalline silicon film to which an impurity element such as phosphorus is doped, can be used. An AgPdCu alloy may be used. A combination of the first conductive film formed by a tantalum (Ta) film and the second conductive film formed by a W film, a combination of the first conductive film formed by a titan nitride (TiN) film and the second conductive film formed by a W film, a combination of the first conductive film formed by a tantalum nitride (TaN) film and the second conductive film formed by an Al film, or a combination of the first conductive film formed by a tantalum nitride (TaN) film and the second conductive film formed by a Cu film is possible.

Next, masks 410 to 415 made of resist using photolithography method are formed, and first etching processing is performed thereon in order to form electrodes and wires. The first etching processing is performed under first and second etching conditions (FIG. 9B). The first etching condition in this example is to use Inductively Coupled Plasma (ICP) etching and to use $CF_4$ and $Cl_2$ and $O_2$ as an etching gas, whose amount of gases are 25/25/10 (sccm), respectively. 500 W of RF (13.56 MHz) power was supplied to a coil type electrode by 1 Pa pressure in order to generate plasma and then to perform etching. 150 W of RF (13.56 MHz) power was also supplied to a substrate side (test sample stage) and substantially negative self-bias voltage was applied. The W film was etched under the first etching condition so as to obtain the end of the first conductive layer in a tapered form.

After that, the first etching condition is shifted to the second etching condition without removing the resist masks 410 to 415. Then, $CF_4$ and $Cl_2$ are used as etching gases. The ratio of the amounts of flowing gasses is 30/30 (sccm). 500 W of RF (13.56 MHz) power is supplied to a coil type electrode by 1 Pa pressure in order to generate plasma and then to perform etching for amount 30 seconds. 20 W of RF (13.56 MHz) power is also supplied to a substrate side (test sample stage) and substantially negative self-bias voltage is applied. Under the second etching condition where $CF_4$ and $Cl_2$ are mixed, both W film and TaN film were etched to the same degree. In order to etch without leaving a residue on the gate insulating film, the etching time may be increased 10 to 20% more.

In the first etching processing, when the form of the mask made of resist is appropriate, the form of the ends of the first and the second conductive layers are in the tapered form due to the effect of the bias voltage applied to the substrate side. The angle of the tapered portion is 15 to 45°. Thus, conductive layers 417 to 422 in a first form are formed which include the first conductive layers and the second conductive layers (first conductive layers 417a to 422a and second conductive layer 417b to 422b) through the first etching processing. In a gate insulating film 416, an area not covered by the conductive layers 417 to 422 in the first form is etched by about 20 to 50 nm so as to form a thinner area.

Next, second etching processing is performed without removing masks made of resist (FIG. 9C). Here, $CF_4$, $Cl_2$ and $O_2$ are used to etch the W film selectively. Then, second conductive layers 428b to 433b are formed by the second etching processing. On the other hand, the first conductive layers 417a to 422a are not etched very much, and conductive layers 428 to 433 in the second form are formed.

First doping processing is performed without removing resist masks and low density of impurity element, which gives n-type to the semiconductor layer, is added. The doping processing may be performed in accordance with the ion-doping method or the ion-implanting method. The ion doping method is performed under a condition in the dose of $1\times10^{13}$ to $5\times10^{14}/cm^2$ and the accelerating voltage of 40 to 80 keV. In this embodiment, the ion doping method is performed under a condition in the dose of $1.5\times10^{13}/cm^2$ and the accelerating voltage of 60 keV. The n-type doping impurity element may be Group 15 elements, typically phosphorus (P) or arsenic As). Here, phosphorus (P) is used. In this case, the conductive layers 428 to 433 function as masks for the n-type doping impurity element. Therefore, impurity areas 423 to 427 are formed in the self-alignment manner. An n-type doping impurity element in the density range of $1\times10^{18}$ to $1\times10^{20}/cm^3$ are added to the impurity areas 423 to 427.

When resist masks are removed, new masks 434a to 434c made of resist are formed. Then, second doping processing is performed by using higher accelerating voltage than that used in the first doping processing. The ion doping method is performed under a condition in the dose of $1\times10^{13}$ to $1\times10^{15}/cm^2$ and the accelerating voltage of 60 to 120 keV. In the doping processing, the second conductive layers 428b to 432b are used as masks against the impurity element. Doping is performed such that the impurity element can be added to the semiconductor layer at the bottom of the tapered portion of the first conductive layer. Then, third doping processing is performed by having lower accelerating voltage than that in the second doping processing to obtain a condition shown in FIG. 10A. The ion doping method is performed under a condition in the dose of $1\times10^{15}$ to $1\times10^{17}/cm^2$ and the accelerating voltage of 50 to 100 keV. Through the second doping processing and the third doping processing, an n-type doping impurity element in the density range of $1\times10^{18}$ to $5\times10^{19}/cm^3$ is added to the low density impurity areas 436, 442 and 448, which overlap with the first conductive layer. An n-type doping impurity element in the density range of $1\times10^{19}$ to $5\times10^{21}/cm^3$ is added to the high density impurity areas 435, 441, 444 and 447.

With proper accelerating voltage, the low density impurity area and the high density impurity area can be formed by performing the second doping processing and the third doping processing once.

Next, after removing resist masks, new masks 450a to 450c made of resist are formed to perform the fourth doping processing. Through the fourth doping processing, impurity areas 453, 454, 459 and 460, to which an impurity element doping a conductive type opposite to the one conductive type is added, in a semiconductor layer, which is an active layer of a p-channel type TFT. Second conductive layers 428a to 432a are used as mask against the impurity element, and the impurity element giving p-type is added so as to form impurity areas in the self-alignment manner. In this embodiment, the impurity areas 453, 454, 459 and 460 are formed by applying ion-doping method using diborane ($B_2H_6$) (FIG. 10B). During the fourth doping processing, the semiconductor layer forming the n-channel TFT is covered by masks 450a to 450c made of resist. Thorough the first to the third doping processing, phosphorus of different densities is added to each of the impurity areas 435 and 459. Doping processing is performed such that the density of p-type doping impurity element can be $1\times10^{19}$ to $5\times10^{21}$ atoms/$cm^3$ in both areas. Thus, no problems are caused when they function as the source region and the drain region of the p-channel TFT.

Impurity areas are formed in the semiconductor layers, respectively, through the processes above.

Next, the masks 450a to 450c made of resist are removed and a first interlayer insulating film 461 is formed thereon. The first interlayer insulating film 461 may be an insulating film with a thickness of 100 to 200 nm containing silicon, which is formed by plasma CVD method or sputtering method. In this embodiment, silicon oxynitride film with a thickness of 150 nm is formed by plasma CVD method. The first interlayer insulating film 461 is not limited to the silicon oxynitride film but may be the other insulating film containing silicon in a single layer or in a laminated pad.

Next, as shown in FIG. 10C, activation processing is performed by using laser irradiation method. By applying any one of embodiment 1 to 4 as the laser irradiation method, a laser beam emitted from the laser is divided into a plurality of laser beams by an optical system, the dividing laser beams are synthesized so as to produce an interference, thereby irradiating the semiconductor film.

A laser beam emitted from $YVO_4$ laser of continuous oscillation type with output of 10 W is modulated to the third harmonic by non-linear optical element. Then, the laser beam is divided into a plurality of laser beams by using an optical system described in any one of embodiments 1 to 4, and the plurality of laser beams are synthesized on the substrate in order to produce an interference. Although a distribution of the energy density assumes a wave form at this moment, a laser beams having an energy density of 80 mj/$cm^2$ or more (preferably 100 mj/$cm^2$ or more) at a peak is required for the crystallization. Then, laser beam is irradiated as moving a stage at a speed of about 10 to 200 cm/s.

Also, the activation processing may be conducted before the first interlayer insulating film is formed.

After the heating processing (thermal processing at 300 to 550° C. for 1 to 12 hours) is performed, hydrogenation can be performed. This process terminates the dangling bond of the semiconductor layer with hydrogen contained in the first interlayer insulating film 461. The semiconductor layer can be hydrogenated regardless of the existence of the first interlayer insulating film. Alternatively, the hydrogenation may be plasma hydrogenation (using hydrogen excited by plasma) or heating processing in an atmosphere containing 3 to 100% of hydrogen at 300 to 450° C. for 1 to 12 hours.

Next, a second interlayer insulating film 462 formed by an inorganic insulating material or an organic insulating material is formed on the first interlayer insulating film 461. In this embodiment, an acrylic resin film with a thickness of 1.6 μm is formed, whose viscosity is 10 to 1000 cp, preferably 40 to 200 cp and which has depressions and projections formed on the surface.

In this embodiment, in order to prevent mirror reflection, a second interlayer insulating film having projections and depressions on the surface is formed. Thus, the projections and depressions are formed on the surface of the pixel electrode. In order to obtain an effect of light dispersion by forming the depressions and projections on the surface of the pixel electrode, a projecting portion may be formed under the pixel electrode. In this case, the projecting portion can be formed by using the same photomask for forming a TFT. Thus, the projecting portion can be formed without any increase in the number of steps. The projecting portion may be provided as necessary on the substrate in the pixel area except for wirings and the TFT portion. Accordingly, projections and depressions can be formed on the surface of the pixel electrode along the projections and depressions formed on the surface of an insulating film covering the projecting portion.

Alternatively, the second interlayer insulating film 462 may be a film having a flattened surface. In this case, after the pixel electrode is formed, projections and depressions are formed on the surface by performing an added process such as publicly known sand-blast method and etching method. Preferably, by preventing mirror reflection and by dispersing reflected light, the whiteness is increased.

Figure 11:
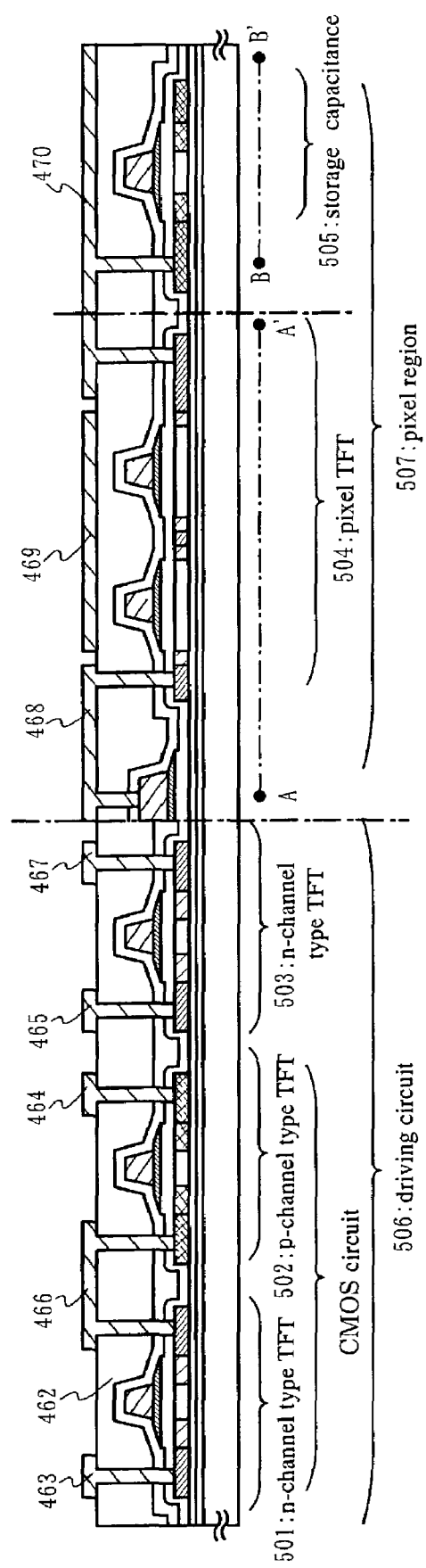
FIG. 11 is a sectional view showing the step of forming the pixel TFT and the TFT of the drive circuit.

Wirings 463 to 467 electrically connecting to impurity areas, respectively, are formed in a driver circuit 506. These wirings are formed by patterning a film laminating a Ti film with a thickness of 50 nm and an alloy film (alloy film of Al and Ti) with a thickness of 500 nm. It is not limited to the two-layer structure but may be a one-layer structure or a laminate pad including three or more layers. The materials of the wirings are not limited to Al and Ti. For example, the wiring can be formed by forming Al or Cu on a TaN film and then by patterning the laminate film in which a Ti film is formed (FIG. 11).

In a pixel portion 507, a pixel electrode 470, a gate wiring 469 and a connecting electrode 468 are formed. Source wirings (a laminate of layers 443a and 443b) are electrically connected with a TFT pixel by the connecting electrode 468. The gate wiring 469 is electrically connected with a gate electrode of the TFT pixel. A pixel electrode 470 is electrically connected with a drain region 442 of the TFT pixel. Furthermore, the pixel electrode 470 is electrically connected with a semiconductor layer 459 functioning as one electrode forming a storage capacitor. Desirably, a material having excellent reflectivity such as a film mainly containing Al or Ag or the laminate film is used for the pixel electrode 470.

In this way, the driver circuit 506 having a CMOS circuit including an n-channel TFT 501 and a p-channel TFT 502 and a n-channel TFT 503, and the pixel portion 507 having the TFT pixel 504 and the storage capacitor 505 can be formed on the same substrate. Thus, an active matrix substrate is completed.

The n-channel TFT 501 of the driver circuit 506 has a channel forming region 437, a low density impurity area 436 overlapping with the first conductive layer 428a, which constructs a part of the gate electrode (GOLD area), and a high density impurity area 452 functioning as the source region or the drain region are implanted. The p-type channel TFT 502 forming a CMOS circuit together with the n-channel TFT 501, which are connected by an electrode 466, has a channel forming region 440, a high density impurity area 454 functioning as the source region or the drain region, and an impurity area 453 to which an n-type doping impurity element and a p-type doping impurity element are implanted. The n-channel TFT 503 has a channel forming region 443, a low density impurity area 442 overlapping with the first conductive layer 430a, which constructs a part of the gate electrode, (GOLD area), a high density impurity area 456 functioning as the source region or the drain region, and an impurity area 455 to which an n-type doping impurity element and a p-type doping impurity element are implanted.

The TFT pixel 504 of the pixel portion has a channel forming region 446, a low density impurity area 445 formed outside of the gate electrode (LDD region) and a high density impurity area 458 functioning as the source region or the drain region are implanted. An n-type doping impurity element and a p-type doping impurity element are added to a semiconductor layer functioning as one electrode of the storage capacitor 505. The storage capacitor 505 is formed by an electrode (a laminate of layers 432a and 432b) and a semiconductor layer by using the insulating film 416 as a dielectric.

The pixel structure in this embodiment is arranged such that light can be blocked in a space between pixel electrodes and the ends of the pixel electrodes can overlap with the source wiring without using the black matrix.

Figure 12:
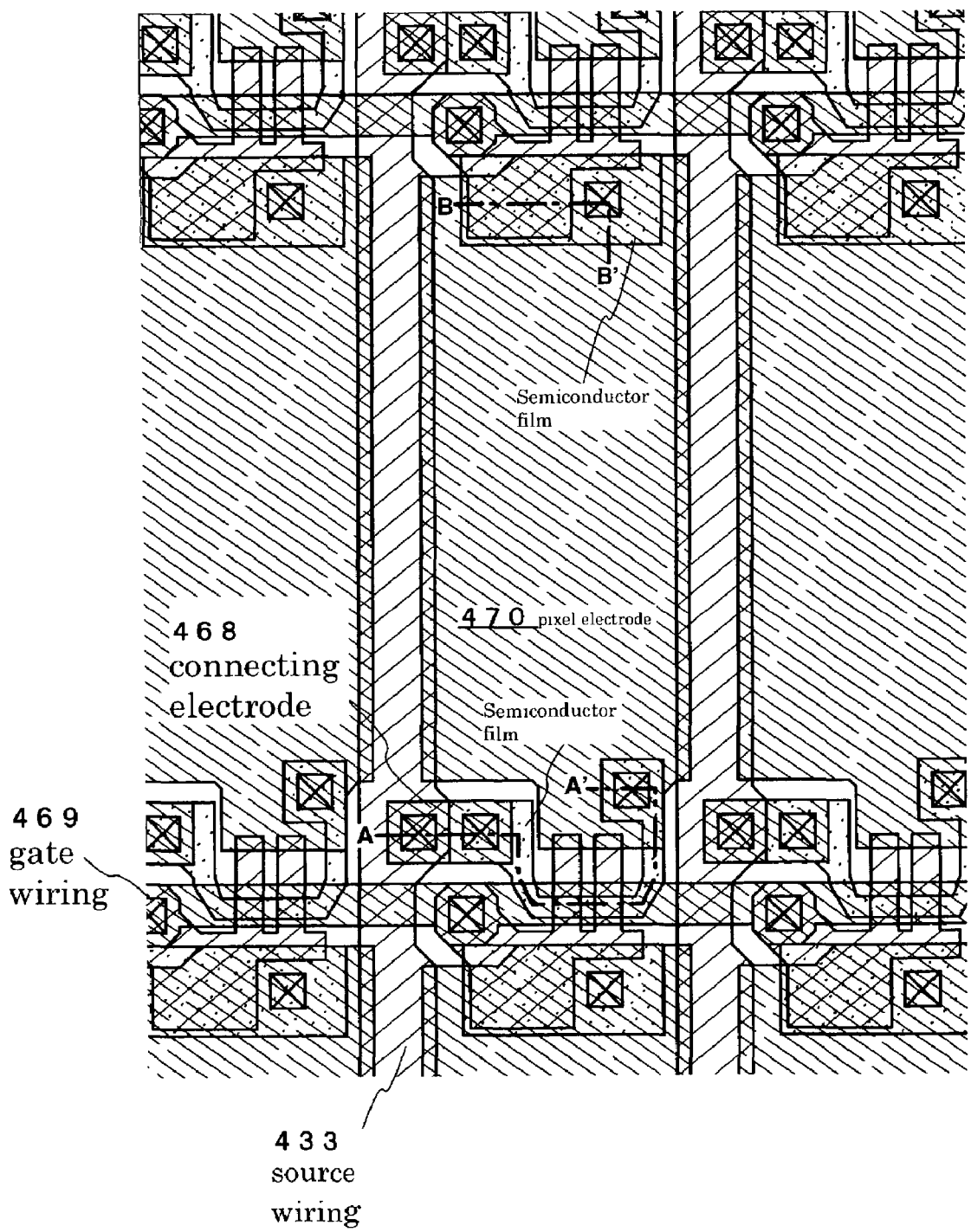
FIG. 12 is a top plan view showing a configuration of the pixel TFT.

FIG. 12 shows a top view of the pixel portion of the active matrix substrate produced in this example. The same reference numerals are used for the corresponding parts in FIGS. 9 to 12. A broken line A-A' in FIG. 11 corresponds to a sectional view taken along a broken line A-A' in FIG. 12. A broken line B-B' in FIG. 11 corresponds to a sectional view taken along a broken line B-B' in FIG. 12.

Example 6

Figure 13:
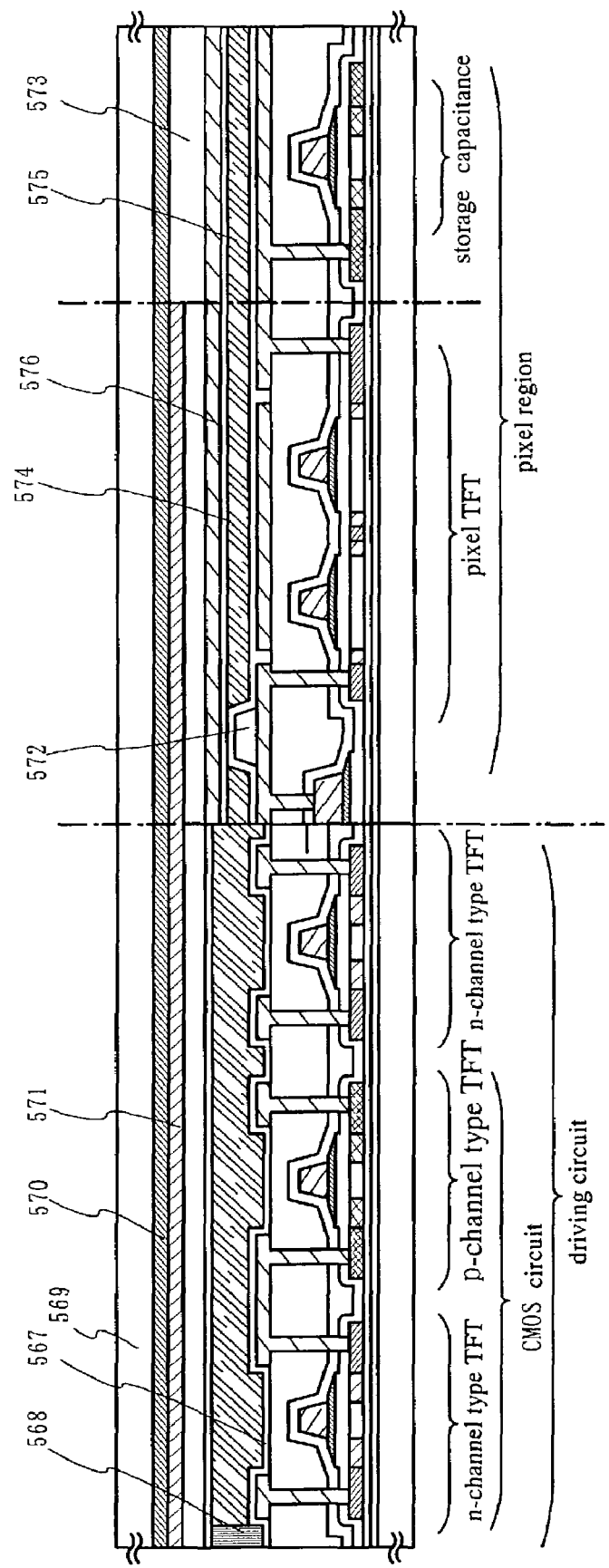
FIG. 13 is a sectional view showing an active matrix liquid-crystal display unit.

This embodiment explains, below, a process to manufacture a reflection type liquid crystal display device from the active matrix substrate made in embodiment 5, using FIG. 13.

First, after obtaining an active matrix substrate in the state of FIG. 11 according to embodiment 5, an orientation film 567 is formed at least on the pixel electrodes 470 on the active matrix substrate of FIG. 11 and subjected to a rubbing process. Incidentally, in this embodiment, prior to forming an orientation film 567, an organic resin film such as an acryl resin film is patterned to form columnar spacers 572 in a desired position to support the substrates with spacing. Meanwhile, spherical spacers, in place of the columnar spacers, may be distributed over the entire surface of the substrate.

Then, a counter substrate 569 is prepared. Then, a coloring layer 570, 571 and a planarizing film 573 are formed on a counter substrate 569. A shade portion is formed by overlapping a red coloring layer 570 and a blue coloring layer 571 together. Meanwhile, the shade portion may be formed by partly overlapping a red coloring layer and a green coloring layer.

In this embodiment is used a substrate shown in Embodiment 5. Accordingly, in FIG. 12 showing a top view of the pixel portion of Embodiment 5, there is a need to shade at least the gap between the gate wiring 469 and the pixel electrode 470, the gap between the gate wiring 469 and the connecting electrode 468 and the gap between the connecting electrode 468 and the pixel electrode 470. In this embodiment were bonded together the substrates by arranging the coloring layers so that the shading portion having a lamination of coloring layers is overlapped with the to-be-shading portion.

In this manner, the gaps between the pixels are shaded by the shading portion having a lamination of coloring layers without forming a shading layer such as a black mask, thereby enabling to reduce the number of processes.

Then, a counter electrode 576 of a transparent conductive film is formed on the planarizing film 573 at least in the pixel portion. An orientation film 574 is formed over the entire surface of the counter substrate and subjected to a rubbing process.

Then, the active matrix substrate formed with the pixel portion and driver circuit and the counter substrate are bonded together by a seal member 568. The seal member 568 is mixed with filler so that the filler and the columnar spacers bond together the two substrates through an even spacing. Thereafter, a liquid crystal material 575 is poured between the substrates, and completely sealed by a sealant (not shown). The liquid crystal material 575 may be a known liquid crystal material. In this manner, completed is a reflection type liquid crystal display device shown in FIG. 13. If necessary, the active matrix substrate or counter substrate is divided into a desired shape. Furthermore, a polarizing plate (not shown) is bonded only on the counter substrate. Then, an FPC is bonded by a known technique.

The liquid crystal display device manufactured as above comprises TFT manufactured by a semiconductor film, wherein a laser beam having a periodic or uniform energy distribution is irradiated and a crystal grain with a large grain size is formed. Thus, the liquid crystal display device ensures a good operational characteristic and high reliability. The liquid crystal display device can be used as a display portion for an electronic appliance in various kinds.

Incidentally, this embodiment can be freely combined with Embodiments 1 to 5.

Embodiment 7

This embodiment explains an embodiment of manufacturing a light emitting device by using a method of manufacturing TFT when an active matrix substrate is fabricated in the Embodiment 5. In this specification, the light-emitting device refers, generally, to the display panel having light-emitting elements formed on a substrate sealed between the substrate and a cover member, and the display module having TFTs or the like mounted on the display panel. Incidentally, the light emitting element has a layer including an organic compound that electroluminescence caused is obtained by applying an electric field (light emitter), an anode layer and a cathode layer. Meanwhile, the electroluminescence in compound includes the light emission upon returning from the singlet-excited state to the ground state (fluorescent light) and the light emission upon returning from the triplet-excited state to the ground state (phosphorous light), including any or both of light emission.

All the layers that are provided between an anode and a cathode in a light emitting element are a light emitter in this specification. Specifically, the light emitter includes a light emitting layer, a hole injection layer, an electron injection layer, a hole transporting layer, an electron transporting layer, etc. A basic structure of a light emitting element is a laminate of an anode layer, a light emitter, and a cathode layer layered in this order. The basic structure can be modified into a laminate of an anode layer, a hole injection layer, a light emitting layer, and a cathode layer layered in this order, or a laminate of an anode layer, a hole injection layer, a light emitting layer, an electron transporting layer, and a cathode layered in this order.

Figure 14:
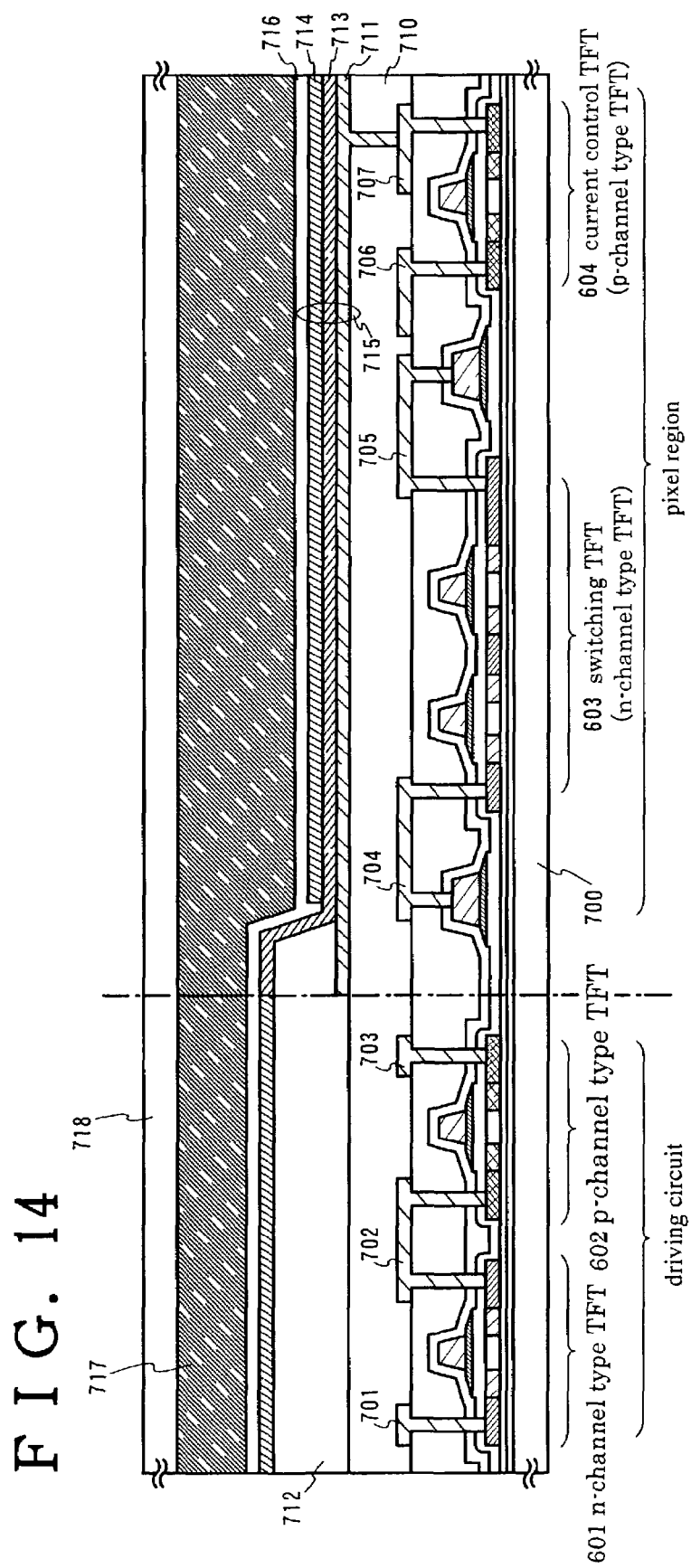
FIG. 14 is a sectional view showing a configuration of a drive circuit and pixel section of a light emitting device.

FIG. 14 is a sectional view of a light-emitting device of this embodiment. In FIG. 14, the switching TFT 603 provided on the substrate 700 is formed by using the n-channel TFT 503 of FIG. 11. Consequently, concerning the explanation of the structure, it is satisfactory to refer the explanation on the n-channel TFT 503.

Incidentally, although this embodiment is of a double gate structure formed with two channel forming regions, it is possible to use a single gate structure formed with one channel forming region or a triple gate structure formed with three channel forming regions.

The driver circuit provided on the substrate 700 is formed by using the CMOS circuit of FIG. 11. Consequently, concerning the explanation of the structure, it is satisfactory to refer the explanation on the n-channel TFT 501 and p-channel TFT 502. Incidentally, although this example is of a single gate structure, it is possible to use a double gate structure or a triple gate structure.

Meanwhile, the wirings 701, 703 serve as source wirings of the CMOS circuit while the wiring 702 as a drain wiring. Meanwhile, a wiring 704 serves as a wiring to electrically connect between the source wiring and the source region of the switching TFT while the wiring 705 serves as a wiring to electrically connect between the drain wiring and the drain region of the switching TFT.

Incidentally, a current control TFT 604 is formed by using the p-channel TFT 502 of FIG. 11. Consequently, concerning the explanation of the structure, it is satisfactory to refer to the explanation on the p-channel TFT 502. Incidentally, although this example is of a single gate structure, it is possible to use a double gate structure or a triple gate structure.

Meanwhile, the wiring 706 is a source wiring of the current control TFT (corresponding to a current supply line) while the wiring 707 is an electrode to be electrically connected to the pixel electrode 711 by being overlaid a pixel electrode 711 of the current control TFT.

Meanwhile, reference numeral 711 is a pixel electrode (anode of a light-emitting element) formed by a transparent conductive film. As the transparent conductive film can be used a compound of indium oxide and tin oxide, a compound of indium oxide and zinc oxide, zinc oxide, tin oxide or indium oxide. The transparent conductive film added with gallium may also be used. The pixel electrode 711 is formed on a planar interlayer insulating film 710 prior to forming the wirings. In this embodiment, it is very important to planarize the step due to the TFT by using a planarizing film 710 made of resin. A light emitter to be formed later, because being extremely thin, possibly causes poor light emission due to the presence of a step. Accordingly, it is desired to provide planarization prior to forming a pixel electrode so that a light emitter can be formed as planar as possible.

After forming the wirings 701 to 707, a bank 712 is formed as shown in FIG. 14. The bank 712 may be formed by patterning an insulating film or organic resin film containing silicon with a thickness of 100 to 400 nm.

Incidentally, because the bank 712 is an insulating film, caution must be paid to element electrostatic breakdown during deposition. In this embodiment added is a carbon particle or metal particle to an insulating film as a material for the bank 712, thereby reducing resistivity and suppressing occurrence of static electricity. In such a case, the addition amount of carbon or metal particle may be adjusted to provide a resistivity of $1\times10^6$ to $1\times10^{12}$ Ωm (preferably $1\times10^8$ to $1\times10^{10}$ Ωm).

A light emitter 713 is formed on the pixel electrode 711. Incidentally, although FIG. 14 shows only one pixel, this embodiment separately forms light-emitting layers correspondingly to the respective colors of R (red), G (green) and B (blue). Meanwhile, in this embodiment is formed a low molecular weight organic electroluminescent material by the deposition process. Specifically, this is a lamination structure having a copper phthalocyanine (CuPc) film provided with a thickness of 20 nm as a hole injecting layer and a tris-8-qyuinolinolato aluminum complex ($Alq_3$) film provided thereon with a thickness of 70 nm as a light emitter. The color of emission light can be controlled by adding a fluorescent pigment, such as quinacridone, perylene or DCM1, to $Alq_3$.

However, the foregoing embodiment is an embodiment of organic electroluminescent material to be used for a light emitter and not necessarily limited to this. It is satisfactory to form a light emitter (layer for light emission and carrier movement therefore) by freely combining a light-emitting layer, a charge transporting layer and a charge injection layer. For example, although in this embodiment was shown the example in which a low molecular weight organic electroluminescent material is used for a light-emitting layer, it is possible to use an intermediate molecular weight organic electroluminescent material or high molecular weight organic electroluminescent material. In this specification, intermediate molecular weight organic electroluminescent material is made an organic light emitting material, which does not have the sublime, and which has 20 or less with 10 μm lengths chain molecular. As an example of using high molecular organic light emitting material, the laminated pad can be made 20 nm thick polythiophene (PEDOT) films is provided by spin coating method as a hole injection layer, and 100 nm thick paraphenylene-vinylene (PPV) films thereon. The light emitting wave length can be selected from red through blue by using π conjugated system high molecular of PPV. The inorganic material such as a silicon carbide can be used as an charge transporting layer and an charge injection layer. Known materials can be used to these organic light emitting layer and the inorganic light emitting layer.

Next, a cathode 714 of a conductive film is provided on the light-emitting layer 713. In this embodiment, as the conductive film is used an alloy film of aluminum and lithium. A known MgAg film (alloy film of magnesium and silver) may be used. As the cathode material may be used a conductive film of an element belonging to the periodic-table group 1 or 2, or a conductive film added with such an element.

A light-emitting element 715 is completed at a time having formed up to the cathode 714. Incidentally, the light-emitting element 715 herein refers to a diode formed with a pixel electrode (anode) 711, a light-emitting layer 713 and a cathode 714.

It is effective to provide a passivation film 716 in such a manner to completely cover the light-emitting element 715. The passivation film 716 is formed by an insulating film including a carbon film, a silicon nitride film or a silicon oxynitride film, and used is an insulating film in a single layer or a combined lamination.

In such a case, it is preferred to use a film favorable in coverage as a passivation film. It is effective to use a carbon film, particularly DLC (diamond-like carbon) film. The DLC film, capable of being deposited in a temperature range of from room temperature to 100° C. or less, can be easily deposited over the light emitter 713 low in heat resistance. Meanwhile, the DLC film, having a high blocking effect to oxygen, can suppress the light emitter 713 from oxidizing. Consequently, prevented is the problem of oxidation in the light emitter 713 during the following seal process.

Furthermore, a seal member 717 is provided on the passivation film 716 to bond a cover member 718. For the seal member 717 used may be an ultraviolet curable resin. It is effective to provide therein a substance having a hygroscopic effect or an antioxidant effect. Meanwhile, in this embodiment, for the cover member 718 used is a glass substrate, quartz substrate or plastic substrate (including a plastic film) having carbon films (preferably diamond-like carbon films) formed on the both surfaces thereof Thus, completed is a light-emitting device having a structure as shown in FIG. 14. Incidentally, it is effective to continuously carry out, without release to the air, the process to form a passivation film 716 after forming a bank 712 by using a deposition apparatus of a multi-chamber scheme (or in-line scheme). In addition, with further development it is possible to continuously carry out the process up to bonding a cover member 718, without release to the air.

In this manner, n-channel TFTs 601, 602, a switching TFT (n-channel TFT) 603 and a current control TFT (n-channel TFT) 604 are formed on the substrate 700.

Furthermore, as was explained using FIG. 14, by providing an impurity region overlapped with the gate electrode through an insulating film, it is possible to form an n-channel TFT resistive to the deterioration resulting from hot-carrier effect. Consequently, a reliable light-emitting device can be realized.

Meanwhile, this embodiment shows only the configuration of the pixel portion and driver circuit. However, according to the manufacturing process in this embodiment, besides there, it is possible to form logic circuits such as a signal division circuit, a D/A converter, an operation amplifier, a γ-correction circuit on the same insulating film. Furthermore, a memory or microprocessor can be formed.

The light-emitting device manufactured as above comprises TFT manufactured by a semiconductor film, wherein a laser beam having a periodic or uniform energy distribution is irradiated and a crystal grain with a large grain size is formed. Thus, the light-emitting device ensures a good operational characteristic and high reliability. The light-emitting device can be used as a display portion for an electronic appliance in various kinds.

Incidentally, this embodiment can be freely combined with any one of Embodiments 1 to 5.

Embodiment 8

Various semiconductor apparatuses (active matrix type liquid crystal display device, active matrix type light emitting device and active matrix type EC display device) can be formed by applying the present invention. That is, the present invention can be applied to various electronic devices incorporating these electro-optical devices into the display portion.

As such electronic apparatus, there are pointed out a video camera, a digital camera, a projector, a head mount display (goggle type display), a car navigation system, a car stereo, a personal computer, a portable information terminal (mobile computer, portable telephone, electronic book or the like) and the like. Embodiments of these are shown in FIGS. 15A-15F, 16A-16D, and 17A-17C.

FIG. 15A shows a personal computer including a main body 3001, an image input portion 3002, a display portion 3003, keyboards 3004 and the like. The present invention can be applied to the display portion 3003.

FIG. 15B shows a video camera including a main body 3101, a display portion 3102, a voice input portion 3103, operation switches 3104, a battery 3105, an image receiving portion 3106 and the like. The present invention can be applied to the display portion 3102.

FIG. 15C shows a mobile computer including a main body 3201, a camera portion 3202, an image receiving portion 3203, an operation switch 3204, a display portion 3205 and the like. The present invention can be applied to the display portion 3205.

FIG. 15D shows a goggle type display including a main body 3301, a display portion 3302, an arm portion 3303 and the like. The present invention can be applied to the display portion 3302.

FIG. 15E shows a player using a record medium recorded with programs (hereinafter, referred to as record medium) including a main body 3401, a display portion 3402, a speaker portion 3403, a record medium 3404, an operation switch 3405 and the like. The player uses DVD (Digital Versatile Disc), CD or the like as the record medium and can enjoy music, enjoy movie and carry out game or Internet. The present invention can be applied to the display portion 3402.

FIG. 15F shows a digital camera including a main body 3501, a display portion 3502, an eye contact portion 3503, operation switches 3504, an image receiving portion (not illustrated) and the like. The present invention can be applied to the display portion 3502.

Figure 16A:
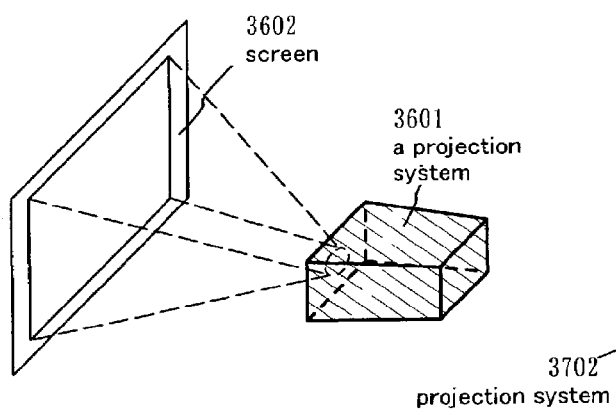
FIGS. 16A to D are diagrams showing examples of the semiconductor devices.

FIG. 16A shows a front type projector including a projection apparatus 3601, a screen 3602 and the like. The present invention can be applied to the liquid crystal display device 3808 forming a part of the projection apparatus 3601 and other driver circuits.

Figure 16B:
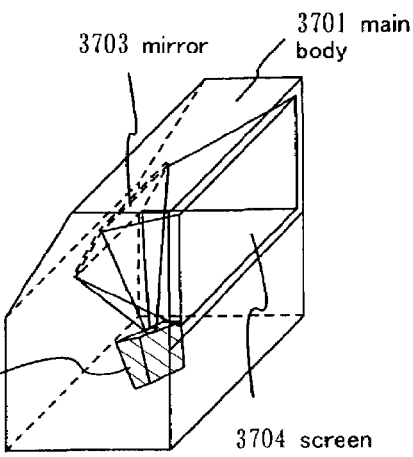

FIG. 16B shows a rear type projector including a main body 3701, a projection apparatus 3702, a mirror 3703, a screen 3704 and the like. The present invention can be applied to the liquid crystal display device 3808 forming a part of the projection apparatus 3702 and other driver circuits.

Figure 16C:
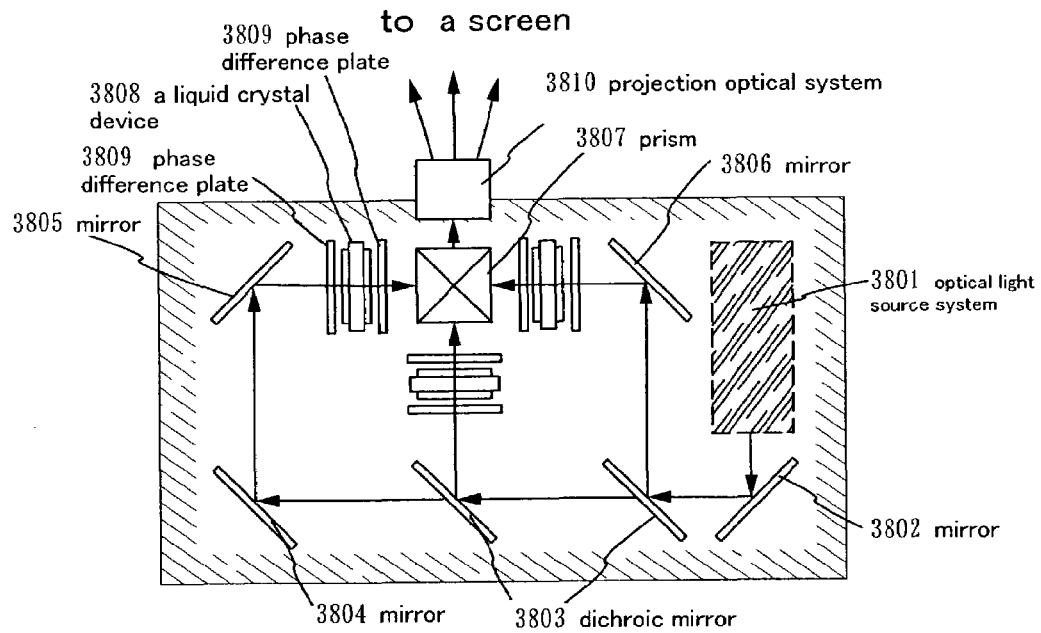

Further, FIG. 16C is a view showing an embodiment of a structure of the projection apparatus 3601 and 3702 in FIG. 16A and FIG. 16B. The projection apparatus 3601 or 3702 is constituted by a light source optical system 3801, mirrors 3802, and 3804 through 3806, a dichroic mirror 3803, a prism 3807, a liquid crystal display device 3808, a phase difference plate 3809 and a projection optical system 3810. The projection optical system 3810 is constituted by an optical system including a projection lens. Although this embodiment shows an embodiment of three plates type, this embodiment is not particularly limited thereto but may be of, for example, a single plate type. Further, person of executing this embodiment may pertinently provide an optical system such as an optical lens, a film having a polarization function, a film for adjusting a phase difference or an IR film in an optical path shown by arrow marks in FIG. 16C.

Figure 16D:
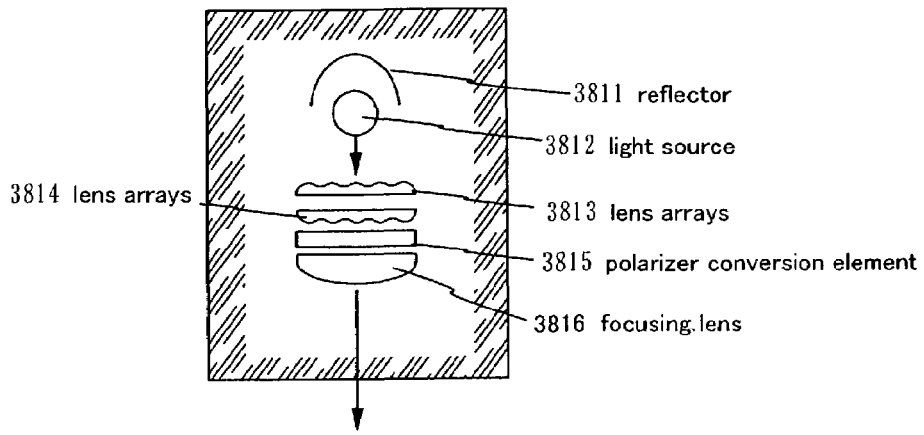

Further, FIG. 16D is a view showing an example of a structure of the light source optical system 3801 in FIG. 16C. According to this example, the light source optical system 3801 is constituted by a reflector 3811, a light source 3812, lens arrays 3813 and 3814, a polarization conversion element 3815 and a focusing lens 3816. Further, the light source optical system shown in FIG. 16D is only an example and this example is not particularly limited thereto. For example, a person of executing this example may pertinently provide an optical system such as an optical lens, a film having a polarization function, a film for adjusting a phase difference or an IR film in the light source optical system.

However, according to the projectors shown in FIG. 16, there is shown a case of using a transmission type electro-optical device and an example of applying a reflection type electro-optical device or light emitting device are not illustrated.

Figure 17A:
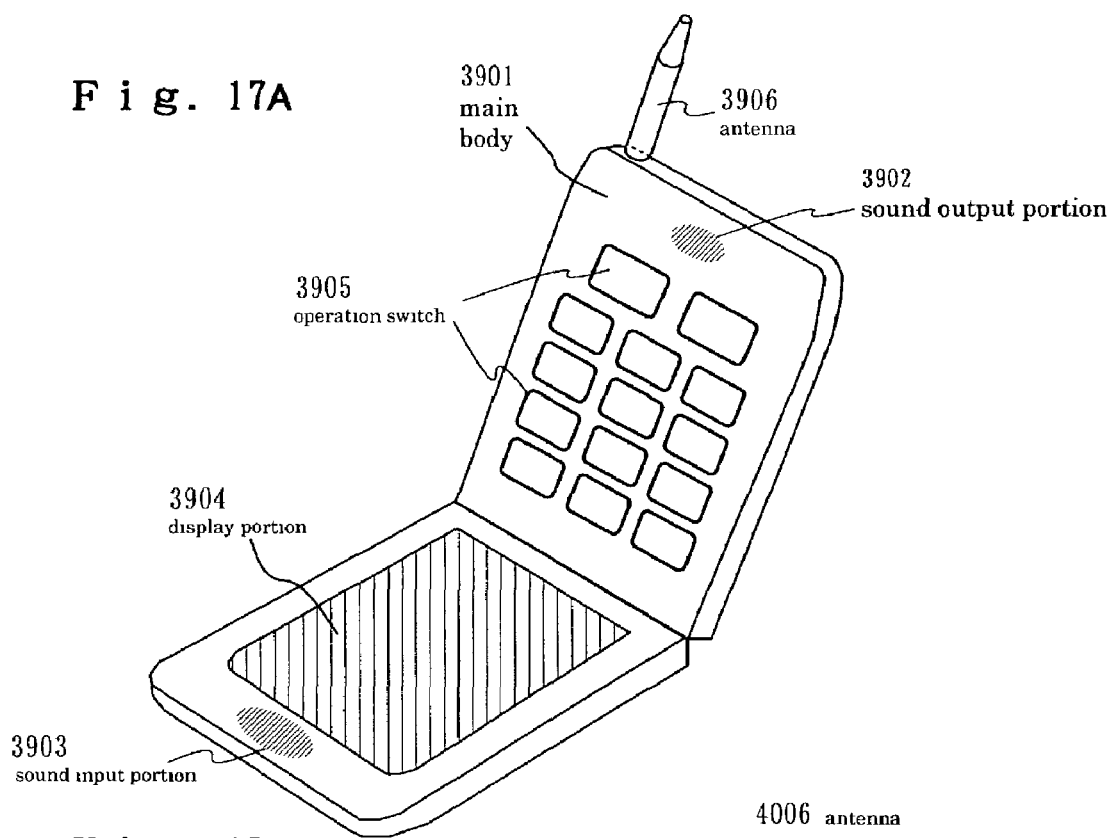
FIGS. 17A, 17B and 17C diagrams showing examples of the semiconductor devices.

FIG. 17A shows a portable telephone including a main body 3901, a sound output portion 3902, a sound input portion 3903, a display portion 3904, an operation switch 3905, an antenna 3906 and the like. The present invention can be applied to display portion 3904.

Figure 17B:
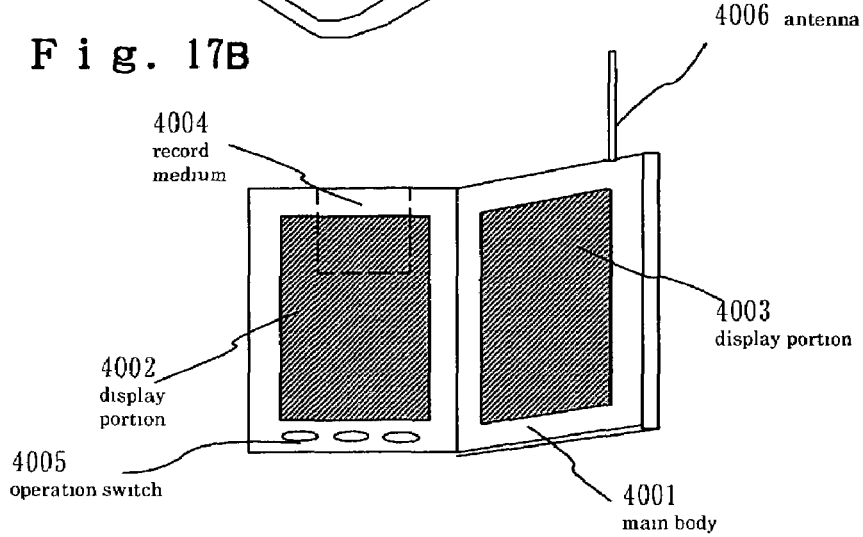

FIG. 17B shows a portable book (electronic book) including a main body 4001, display portions 4002, 4003, a record medium 4004, an operation switch 4005, an antenna 4006 and the like. The present invention can be applied to display portions 4002 and 4003.

Figure 17C:
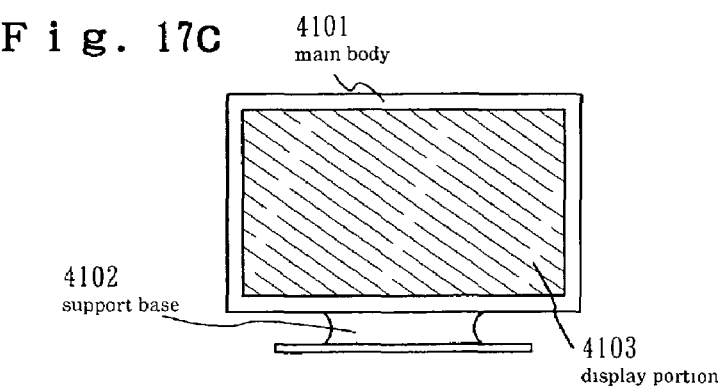

FIG. 17C shows a display including a main body 4101, a support base 4102, a display portion 4103 and the like. The present invention can be applied to display portion 4103. The display according to the invention is advantageous particularly in the case of large screen formation and is advantageous in the display having a diagonal length of 10 inch or more (particularly, 30 inch or more).

As has been described, the range of applying the present invention is extremely wide and is applicable to electronic appliance in various kinds. The electronic apparatus of this example can be implemented by freely combined with any of the structures in embodiments 1 to 6 or embodiment 7.

The following fundamental advantages can be attained by adopting the constitution of the invention:

(a) an ability to covert a laser light having an energy of high coherence to a laser light having an energy density adapted to a semiconductor film;
(b) a sufficient adaptability to a laser light having a high coherence;
(c) an ability to perform the laser irradiation even on a large size substrate by moving the substrate; and
(d) an ability to implement an efficient irradiation of laser light in the laser irradiation method and the laser irradiation apparatus for carrying out the method, provided that the method and apparatus have accomplished the above advantages. Where applied to a semiconductor device such as represented by an active matrix liquid-crystal display unit, the invention can achieve the improvement in the operation characteristics and reliability of the semiconductor device. Furthermore, the invention can realize the reduction of fabrication costs for the semiconductor device.

What is claimed is:

1. A laser irradiation apparatus comprising:
a laser for emitting a laser beam;
a first optical system for dividing the laser beam into a plurality of laser beams; and
a second optical system for forming a synthesized laser beam having a periodical energy distribution on an irradiated surface by synthesizing the plurality of laser beams,
wherein said first optical system is disposed between said laser and the second optical system,
wherein said first optical system comprises a prism,
wherein said second optical system comprises a cylindrical lens, and wherein a laser beam of the plurality of laser beams directly reaches the irradiated surface from the cylindrical lens.

2. A laser irradiation apparatus comprising:
a laser for emitting a laser beam;
a first optical system and a second optical system,
wherein a laser beam passes through said first optical system so that the laser beam is divided into a plurality of laser beams;
wherein said second optical system is disposed in a manner to superimpose light axes of the plurality of laser beams on each other on the irradiated surface to provide a superimposed laser beam, so that the superimposed laser beam presents a periodical energy distribution on the irradiated surface,
wherein said first optical system comprises a prism,
wherein said second optical system comprises a cylindrical lens, and
wherein a laser beam of the plurality of laser beams directly reaches the irradiated surface from the cylindrical lens.

3. A laser irradiation apparatus according to claim 1 or claim 2, wherein the synthesized laser beam or superimposed laser beam irradiated on said irradiation surface is produced by interfering the plurality of laser beams.

4. A laser irradiation apparatus according to claim 1 or claim 2, wherein said first optical system and said second optical system are disposed in a manner to apply the laser beam emitted from said laser to the irradiated surface in a slanting direction.

5. A laser irradiation apparatus according to claim 1 or claim 2, wherein said first optical system and said second optical system are disposed so that the laser beam emitted from said laser is incident to the irradiated surface at the incidence angle θ which is determined to range between 3 and 32 degrees.

6. A laser irradiation apparatus according to claim 1 or claim 2, wherein said second optical system further comprises a prism or a mirror.

7. A laser irradiation apparatus according to claim 1 or claim 2, wherein said laser beam is emitted from a solid state laser of a continuous wave type or a solid state laser of a pulse oscillation type.

8. A laser irradiation apparatus according to claim 7, wherein said solid state laser comprises one selected from the group consisting of YAG laser, $YVO_4$ laser, YLF laser, $YAlO_3$ laser, glass laser, ruby laser, alexandrite laser, Ti:sapphire laser.

9. A method of manufacturing a semiconductor device, wherein a semiconductor film of the semiconductor device is annealed by a laser irradiation apparatus according to claim 1 or claim 2.

10. A laser irradiation method, comprising:
dividing laser beam emitted from a single laser into a plurality of light beams by means of a first optical system comprising a prism;
irradiating the plurality of divided laser beams with an irradiated surface of a substrate in slanting directions by a second optical system comprising a cylindrical lens, wherein a laser beam of the plurality of laser beams directly reaches the irradiated surface from the cylindrical lens; and
synthesizing the plurality of laser beams to present a periodical energy distribution on said irradiated surface to irradiate a synthesized laser beam on said irradiation surface,
wherein a semiconductor film having said irradiated surface is crystallized by said synthesized laser.

11. A laser irradiation method, comprising:
dividing a laser beam irradiated from a single laser into a plurality of laser beams by means of a first optical system comprising a prism;
irradiating the plurality of laser beams in slanting directions on an irradiated surface of a semiconductor film by means of a second optical system comprising a cylindrical lens, wherein a laser beam of the plurality of laser beams directly reaches the irradiated surface from the cylindrical lens; and
synthesizing the plurality of laser beams to present a periodical energy distribution to a first direction on said irradiated surface to irradiate a synthesized laser beam on said irradiated surface along a first direction and along a second direction perpendicular to said first direction,
wherein the semiconductor film having said irradiated surface is crystallized by said synthesized laser.

12. A laser irradiation method according to claim 10 or claim 11, wherein the synthesized laser beam on said irradiation surface is produced by interfering the plurality of laser beams.

13. A laser irradiation method according to claim 10 or claim 11, wherein each of the plurality of laser beams is incident to said irradiated surface at the incidence angle which is determined to range between 3 and 32 degrees so that a crystal grain width in the semiconductor film is matched with a pitch p of an interference produced by the plurality of divided laser beams.

14. A laser irradiation method according to claim 10 or claim 11, wherein said second optical system further comprises a prism or a mirror.

15. A laser irradiation method according to claim 10 or claim 11, wherein said laser light is emitted from a solid state laser of a continuous wave type or a solid state laser of a pulse oscillation type.

16. A laser irradiation method according to claim 10 or claim 11, wherein said solid state laser comprises one selected from the group consisting of YAG laser, $YVO_4$ laser, YLF laser, $YAlO_3$ laser, glass laser, ruby laser, alexandrite laser, Ti:sapphire laser.

17. A method of manufacturing a semiconductor device, wherein a semiconductor film is annealed by a laser irradiation method according to claim 10 or claim 11.

18. A laser irradiation method according to claim 10 or claim 11, wherein the synthesized or superimposed laser beam is irradiated on the irradiated surface by superimposing first and second interferences on first and second laser beams of the laser beams with a phase of an energy distribution of the first interference shifted from a phase of an energy distribution of the second interference by a half period when the first and second interferences have the same energy distribution so as to form a laser light presenting a uniform energy distribution.

19. A laser irradiation method according to claim 10 or claim 11, wherein the second optical system comprises lenses with a micrometer.

20. A laser irradiation apparatus comprising:
a laser emitting a laser beam;
a first optical system for dividing the laser beam into a plurality of laser beams by only a transmission function of said first optical system; and a second optical system for forming a synthesized laser beam having a periodical energy distribution on an irradiated surface by synthesizing the plurality of laser beams, wherein said first optical system is disposed between said laser and the second optical system, wherein the first optical system comprises a cylindrical lens array and a cylindrical lens, and wherein the second optical system comprises a first lens, a second lens, and, a third lens.

21. A laser irradiation apparatus comprising:

a laser emitting a laser beam;

a first optical system and a second optical system, wherein a laser beam passes through said first optical system so that the laser beam is divided into a plurality of laser beams;

wherein said second optical system is disposed in a manner to superimpose light axes of the plurality of laser beams on each other on the irradiated surface to provide a superimposed laser beam so that the superimposed laser beam presents a periodical energy distribution on the irradiated surface, wherein the first optical system comprises a cylindrical lens array and a cylindrical lens, and wherein the second optical system comprises a first lens, a second lens, and, a third lens.

22. A laser irradiation apparatus according to claim 20 or claim 21, wherein the synthesized laser beam or superimposed laser beam irradiated on said irradiation surface is produced by interfering the plurality of laser beams.

23. A laser irradiation apparatus according to claim 20 or claim 21, wherein said first optical system and said second optical system are disposed in a manner to apply the laser beam emitted from said laser to the irradiated surface in a slanting direction.

24. A laser irradiation apparatus according to claim 20 or claim 21, wherein said first optical system and said second optical system are disposed so that the laser beam emitted from said laser is incident to the irradiated surface at the incidence angle which is determined to range between 3 and 32 degrees.

25. A laser irradiation apparatus according to claim 20 or claim 21, wherein said laser light is emitted from a solid state laser of a continuous wave type or a solid state laser of a pulse oscillation type.

26. A laser irradiation apparatus according to claim 25, wherein said solid state laser comprises one selected from the group consisting of YAG laser, $YVO_4$ laser, YLF laser, $YAlO_3$ laser, glass laser, ruby laser, alexandrite laser, Ti:sapphire laser.

27. A laser irradiation apparatus according to any one of claims 1, 2, 20 or claim 21, wherein the first optical system further comprises a cylindrical lens.

28. A laser irradiation apparatus according to claim 20 or claim 21, wherein the first lens and the third lenses are movable with at least one micrometer.

29. A laser irradiation apparatus according to claim 20 or claim 21, wherein the first, second and third lenses are disposed in a mariner that a distance between a side face of the second lens and the first lens is different from a distance between a side face of the second lens and the third lens.

30. A laser irradiation apparatus according to claim 20 or claim 21, wherein the first, second and third lenses are disposed in a manner that a distance between a side face of the second lens and the first lens and a distance between a side face of the second lens and the third lens is the same.

* * * * *